(12) United States Patent
Takayama et al.

(10) Patent No.: US 12,352,707 B2
(45) Date of Patent: Jul. 8, 2025

(54) BAGGAGE INSPECTION DEVICE

(71) Applicant: THE NIPPON SIGNAL CO., LTD., Tokyo (JP)

(72) Inventors: Kazuaki Takayama, Kuki (JP); Yutaka Hasebe, Kuki (JP); Masaki Takahashi, Kuki (JP); Chihaya Ogawa, Kuki (JP); Kiyotaka Uchida, Kuki (JP); Yoshiyuki Ikemoto, Kuki (JP); Eishi Kawasaki, Kuki (JP); Tetsuo Murakami, Kawasaki (JP)

(73) Assignee: THE NIPPON SIGNAL CO., LTD. (JP)

( * ) Notice: Subject to any disclaimer, the term of this patent is extended or adjusted under 35 U.S.C. 154(b) by 168 days.

(21) Appl. No.: 17/800,708

(22) PCT Filed: Jan. 5, 2021

(86) PCT No.: PCT/JP2021/000109
§ 371 (c)(1),
(2) Date: Aug. 22, 2022

(87) PCT Pub. No.: WO2021/166469
PCT Pub. Date: Aug. 26, 2021

(65) Prior Publication Data
US 2023/0080948 A1  Mar. 16, 2023

(30) Foreign Application Priority Data

Feb. 21, 2020 (JP) .................................. 2020-027928

(51) Int. Cl.
*G01N 23/10* (2018.01)
*B65G 49/00* (2006.01)
(Continued)

(52) U.S. Cl.
CPC ............. *G01N 23/10* (2013.01); *B65G 49/00* (2013.01); *G01N 23/04* (2013.01); *G01N 23/083* (2013.01); *G01V 5/20* (2024.01)

(58) Field of Classification Search
CPC ...... G01N 23/10; G01N 23/083; G01N 23/04; G01N 23/20; G01N 2223/643;
(Continued)

(56) References Cited

U.S. PATENT DOCUMENTS

2005/0185757 A1  8/2005  Kresse et al.
2007/0133742 A1*  6/2007  Gatten .................... G01V 5/20
378/57

(Continued)

FOREIGN PATENT DOCUMENTS

CN   105027225 A   11/2015
JP   2002-228601 A   8/2002
(Continued)

OTHER PUBLICATIONS

International Search Report (English and Japanese) issued in PCT/JP2021/000109, mailed Mar. 23, 2021; ISA/JP (8 pages).
(Continued)

*Primary Examiner* — Irakli Kiknadze
(74) *Attorney, Agent, or Firm* — Harness, Dickey & Pierce, P.L.C.

(57) ABSTRACT

This invention provides a baggage inspection device that can maintain or improve inspection throughput. The Baggage Inspection Device 100 according to an embodiment of this invention comprises Conveyor 20 that transports Baggage BA, Inspection Unit 10 that inspects Baggage BA, Curtain 31 that shields X-rays emitted from Inspection Unit 10, and Transportation Assist Mechanism 32 that assists transportation of Baggage BA by moving Curtain 31 that comes into
(Continued)

contact with Baggage BA in a direction along Direction D1, i.e. the transport direction of Baggage BA.

5 Claims, 23 Drawing Sheets

(51) Int. Cl.
*G01N 23/04* (2018.01)
*G01N 23/083* (2018.01)
*G01V 5/20* (2024.01)

(58) Field of Classification Search
CPC ........... G01N 23/046; G01N 2223/419; B65G 49/00; G01V 5/20; G01V 5/22; G01V 5/00; G01V 5/226; G01V 5/0008; G01V 5/222; G01V 5/271; G01V 5/0016; G21F 3/00; G01T 7/08; G01T 7/00; G01T 1/208; G01T 1/1606; A61B 6/4435; A61B 6/485; A61B 6/107; A61B 6/0407; A61B 6/0487; A61B 6/4429; A61B 6/487; A61B 6/447; G21K 1/043; G06Q 50/265; G01G 19/58; G01G 19/52; H05G 1/02
USPC .............................................. 378/56, 57, 62
See application file for complete search history.

(56) References Cited

U.S. PATENT DOCUMENTS

| 2013/0001048 A1 | 1/2013 | Panesar et al. |
| 2015/0262720 A1 | 9/2015 | Weed |
| 2017/0301424 A1 | 10/2017 | Thomas et al. |

FOREIGN PATENT DOCUMENTS

| JP | 2002-318207 A | 10/2002 |
| JP | 2015-537196 A | 12/2015 |
| JP | 2017-58298 A | 3/2017 |
| JP | 2017-194463 A | 10/2017 |
| JP | 2018-165294 A | 10/2018 |
| JP | 6568635 B1 | 8/2019 |

OTHER PUBLICATIONS

Office Action issued in the corresponding Taiwanese Patent Application No. 112129690; dated Jan. 29, 2024 (total 15 pages).
Office Action issued in the corresponding Taiwanese Patent Application No. 112129691; dated Jan. 30, 2024 (total 17 pages).
Office Action issued in the corresponding Taiwanese Patent Application No. 110101365; dated Jun. 8, 2023 (total 7 pages).
Office Action issued in corresponding Taiwanese Patent Application No. 110101365, dated Nov. 14, 2022, with English translation (6 Pages).
Office Action issued in corresponding Taiwanese Patent Application No. 110101365, dated Feb. 11, 2022, with English translation (13 Pages).
Office Action issued in the corresponding Taiwanese Patent Application No. 112129690; issued on Jul. 29, 2024 (total 43 pages).
Office Action issued in the corresponding Taiwanese Patent Application No. 112129691; issued on Jul. 30, 2024 (total 33 pages).
Office Action issued in the corresponding Taiwanese Patent Application No. 112129691; issued on Jan. 13, 2025 (total 6 pages).
Office Action issued in the corresponding Chinese Patent Application No. 202180014476.9; issued on Apr. 4, 2025 (total 23 pages).

* cited by examiner

BAGGAGE INSPECTION DEVICE

TECHNICAL FIELD

This invention relates to a baggage inspection device that inspects baggage while transporting the baggage.

BACKGROUND ART

Known in the art is a technology for baggage inspection. For example, an X-ray device for hazardous object detection is disclosed in Patent Document 1. The X-ray device for hazardous object detection has a shielding curtain to prevent X-ray leakage and a flexible slip sheet provided on the shielding curtain to prevent an object to be inspected from being caught in the shielding curtain.

PRIOR ART DOCUMENT

Patent Document

Patent Document 1: JP2002-228601A

SUMMARY OF THE INVENTION

Problem to be Solved by the Invention

Even if the X-ray device for hazardous object detection disclosed in Patent Document 1 has a structure such as the above-mentioned shielding curtain with a slip sheet, depending on a weight and shape of the object to be inspected, the object may catch in the shielding curtain at the entrance/exit of the inspection device—which may reduce inspection throughput. This problem may be particularly pronounced when baggage of various shapes, sizes, and weights are subject to inspection.

This invention is made in view of the above-mentioned background, and has as an object provision of a baggage inspection device that can maintain or improve inspection throughput, for example, in inspection of baggage at event sites, railroads, and other mass transportation facilities.

Means for Solving the Problem

This invention includes, as a first aspect, a baggage inspection device comprising: a conveyor that transports baggage; an inspection unit that inspects baggage transported by the conveyor; a curtain that shields electromagnetic waves emitted by the inspection unit for inspecting the baggage; and an anti jamming mechanism that prevents the baggage transported by the conveyor from getting jam.

According to the first aspect of the invention, throughput of baggage inspection is maintained or improved.

This invention includes, as a second aspect, a baggage inspection device according to the first aspect, wherein the anti-jamming mechanism has a transportation assist mechanism that moves the curtain in a transport direction of the baggage by the conveyor to assist transportation of the baggage.

According to the second aspect of the invention, when the baggage is transported, the transportation assist mechanism moves the curtain in a transport direction of the baggage to assist transportation of the baggage. Thus, jamming of the baggage by the curtain is avoided, and throughput of baggage inspection is maintained or improved.

This invention includes, as a third aspect, a baggage inspection device according to the second aspect, wherein the curtain is belt-shaped, and the transportation assist mechanism has a shaft from which the curtain is rotatably suspended.

According to the third aspect of the invention, the belt-shaped curtain rotates to assist transportation of the baggage.

This invention includes, as a fourth aspect, a baggage inspection device according to the third aspect, wherein the transportation assist mechanism has a drive mechanism that rotates the shaft.

According to the fourth aspect of the invention, transportation of the baggage is assisted by rotation of the shaft.

This invention includes, as a fifth aspect, a baggage inspection device according to the third aspect, wherein the shaft rotates in conjunction with transportation of the baggage by the conveyor.

According to the fifth aspect of the invention, while the baggage is transported, assistance of transportation of the baggage is performed.

This invention includes, as a sixth aspect, a baggage inspection device according to the third aspect, wherein the transportation assist mechanism freely rotatably holds the curtain.

According to the sixth aspect of the invention, transportation of the baggage is assisted by the curtain that freely rotates.

This invention includes, as a seventh aspect, a baggage inspection device according to the third aspect, wherein the transportation assist mechanism has a swing mechanism that swings the shaft.

According to the seventh aspect of the invention, the shaft is displaced by the swing mechanism in the transport direction of the baggage.

This invention includes, as an eighth aspect, an electromagnetic wave blocking device comprising: a curtain that shields electromagnetic waves emitted by an inspection unit of a baggage inspection device for inspecting baggage; and a transportation assist mechanism that moves the curtain in a transport direction of the baggage towards the inspection unit to assist transportation of the baggage.

According to the eighth aspect of the invention, when the baggage inspection device transports the baggage, the curtain in contact with the baggage moves in the transport direction of the baggage. As a result, jamming of the baggage by the curtain is avoided, and inspection throughput is maintained or improved.

This invention includes, as a ninth aspect, a baggage inspection device according to the first aspect, wherein the anti jamming mechanism has a cover that covers from above at least a part of a conveyor surface on which the baggage is transported, and the cover is shaped such that a cross-section of a space formed between the cover and the conveyor surface perpendicular to a transport direction of the baggage expands downstream in the transport direction of the baggage.

According to the ninth aspect of the invention, occurrence of jamming of the baggage is reduced while the baggage is transported.

This invention includes, as a tenth aspect, a baggage inspection device according to the ninth aspect, wherein the space has at least one of a section that expands continuously and a section that expands stepwise.

According to the tenth aspect of the invention, the baggage is separated from the cover when the baggage is transported even if it comes into contact with the cover.

This invention includes, as an eleventh aspect, a baggage inspection device according to the ninth aspect, wherein the anti-jamming mechanism has a guide member that is located upstream of an entrance to the space and guides the baggage to the entrance in a transport direction of the baggage.

According to the eleventh aspect of the invention, compared to a case where no guide member is provided, the baggage transported by the conveyor can more easily enter the entrance of the inspection unit.

This invention includes, as a twelfth aspect, a baggage inspection device according to the first aspect, wherein the anti jamming mechanism has a displaceable member that is located upstream of the inspection unit in a transport direction of the baggage and is displaced upon coming into contact with the baggage, and a sensor that detects displacement of the displaceable member.

According to the twelfth aspect of the invention, when the baggage transported by the conveyor collides with the displaceable member and the displaceable member is displaced, it is easily determined that the baggage cannot enter the inspection unit. As a result, throughput of baggage inspection is improved and manpower required for baggage inspection is reduced.

This invention includes, as a thirteenth aspect, a baggage inspection device according to the twelfth aspect, wherein the displaceable member is displaced when a size of the baggage is larger than a size that can be inspected by the inspection unit.

According to the thirteenth aspect of the invention, it is determined whether the size of the baggage transported by the conveyor exceeds the size that can be inspected by detecting displacement of the displaceable member.

This invention includes, as a fourteenth aspect, a baggage inspection device according to the twelfth aspect, wherein the sensor has a magnet and a magnetic member that attach to and detach from each other when the displaceable member is displaced.

According to the fourteenth aspect of the invention, displacement of the displaceable member is detected when the magnet and the magnetic member detach from each other.

This invention includes, as a fifteenth aspect, a baggage inspection device according to the twelfth aspect, wherein the sensor is an optical sensor that detects displacement of the displaceable member.

According to the fifteenth aspect of the invention, displacement of the displaceable member is detected when the state of light received by the optical sensor changes due to the displacement of the member.

This invention includes, as a sixteenth aspect, a baggage inspection device according to the twelfth aspect, wherein the displaceable member when displaced forms an opening in a shape corresponding to a range that can be inspected by the inspection unit.

According to the sixteenth aspect of the invention, it is determined whether the size of the baggage is small enough to be inspected by the inspection unit based on whether the baggage can pass through the opening formed by the displaceable member.

This invention includes, as a seventeenth aspect, a baggage inspection device according to the twelfth aspect, comprising: a stopping mechanism that stops transportation of the baggage by the conveyor and inspection of the baggage by the inspection unit when the sensor detects displacement of the displaceable member.

According to the seventeenth aspect of the invention, when the baggage cannot be inspected by the inspection unit, unnecessary operations of the conveyor and the inspection unit for inspecting the baggage are promptly stopped.

This invention includes, as an eighteenth aspect, a baggage inspection device according to the twelfth aspect, wherein the displaceable member has a transparent member that extends along a transport direction of the baggage by the conveyor.

According to the eighteenth aspect of the invention, displacement of the displaceable member is continuously detected during transportation of the baggage, and status of baggage in the displaceable member can be observed from the outside.

BRIEF EXPLANATION OF THE DRAWINGS

FIG. 14A shows a top view of the baggage transported in the space formed by the cover according to the fourth embodiment of this invention.

FIG. 19 FIG. 10 is an oblique view of the baggage inspection device according to a fifth embodiment of this invention.

MODES FOR CARRYING OUT THE INVENTION

First Exemplary Embodiment

Details of Baggage Inspection Device 100 according to a first exemplary embodiment of this invention are described below with reference to drawings.

Figure 1:
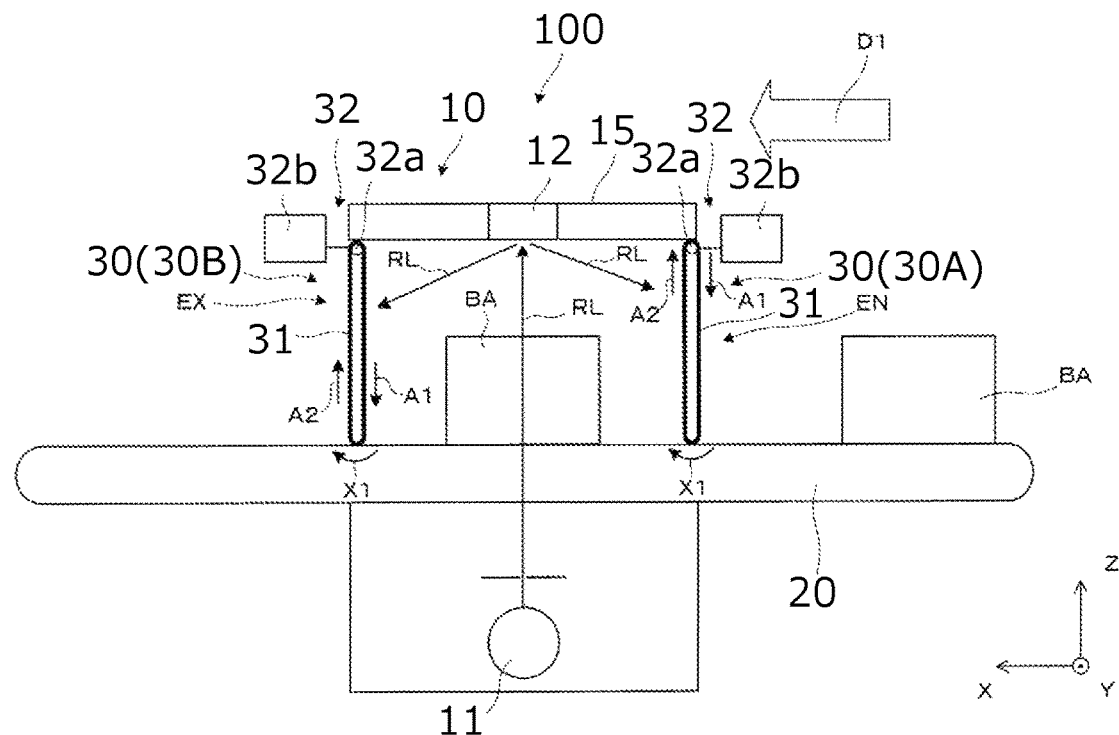
FIG. 1 is a side cross-sectional view of a baggage inspection device according to a first embodiment of this invention.

FIG. 1 is a side cross-sectional view of Baggage Inspection Device 100. Baggage Inspection Device 100 is a device that inspects baggage using X-rays, and installed, for example, at an entrance of an event venue, etc. Baggage Inspection Device 100 comprises Inspection Unit 10 that inspects baggage by emitting X-rays (an example of electromagnetic waves), Conveyor 20 that transports the baggage and Curtain Assembly 30 that shields X-rays emitted by Inspection Unit 10. Inspection Unit 10 inspects Baggage BA. In the following description, as shown in FIG. 1, Direction D1 in which Conveyor 20 transports Baggage BA by is referred to as X-direction, the left-right direction perpendicular to X-direction, i.e. horizontal direction, is referred to as Y-direction, and the up-down direction perpendicular to X-direction and Y-direction, i.e. vertical direction, is referred to as Z-direction.

For example, when a passenger who is entering the event venue places his/her Baggage BA on a conveyor surface of Conveyor 20, Conveyor 20 transports Baggage BA towards Inspection Unit 10. Inspection Unit 10 inspects Baggage BA transported by Conveyor 20. More specifically, Inspection Unit 10 generates a fluoroscopic image of the interior of Baggage BA that shows whether Baggage BA contains a hazardous object. Curtain Assembly 30 is located at each of Entrance EN and Exit EX of Inspection Unit 10. Inspection Unit 10 can inspect Baggage BA when Baggage BA passes through Curtain Assembly 30A on the Entrance EN side and stay in Inspection Unit 10.

Inspection Unit 10 comprises X-ray Emitter 11, X-ray Sensor Unit 12 and X-ray Shielding Box 15. X-ray Emitter 11 emits X-ray RL to Baggage BA. X-ray Sensor Unit 12 has a line sensor module and continuously outputs signals indicating amounts of X-ray RL irradiated from X-ray Emitter 11 and passing through Baggage BA. X-ray Shielding Box 15 is a rectangular-shaped box that houses X-ray Sensor Unit 12 and shields X-ray RL emitted from X-ray Emitter 11.

X-ray Emitter 11 is located on the bottom side (−Z side) near the center of X-ray Shielding Box 15, and emits X-ray RL towards X-ray Sensor Unit 12. X-ray Sensor Unit 12 is located on the upper side (+Z side) near the center of X-ray Shielding Box 15, opposite X-ray Emitter 11 across the transport path of Conveyor 20, and receives X-ray RL. The line sensor module of X-ray Sensor Unit 12 has plural photoreceptors arranged in a straight line in Y-direction perpendicular to Direction D1 (X-direction), and performs a two-dimensional scan of Baggage BA in synchronization with the transportation of Baggage BA by Conveyor 20. When Baggage BA passes near the center of the interior space of X-RAY Shielding Box 15, X-ray Emitter 11 emits X-RAY RL to Baggage BA and a two dimensional scanned image on X-Y plane showing the interior of Baggage BA is generated based on signals output from X-ray Sensor Unit 12. X-ray Shielding Box 15 has Entrance EN and Exit EX, each of which is a rectangular-shaped opening. For example, the inner surface of X-ray Shielding Box 15 is covered with X-ray absorbing material such as lead to prevent leakage of X-rays to the outside. Each of Entrance EN and Exit EX of X-ray Shielding Box 15 is covered by Curtain Assembly 30 that reduces leakage of X-rays outside X-ray Shielding Box 15 via Entrance EN and Exit EX.

In X-ray Shielding Box 15, the transport path of Conveyor 20 extends in X-direction from Entrance EN to Exit EX, and it passes between X-ray Emitter 11 and X-ray Sensor Unit 12. While the Baggage BA is passing between X-ray Emitter 11 and X-ray Sensor Unit 12 in X-ray Shielding Box 15, Baggage BA is inspected.

Curtain Assembly 30 has Curtain 31 and Transportation Assist Mechanism 32 (an example of the anti-jamming mechanism and transportation assist mechanism). Curtain Assembly 30 reduces leakage of X-ray RL outside X-ray Shielding Box 15 and assists transportation of Baggage BA. In the following description, when distinguishing between Curtain Assembly 30 installed in Entrance EN and Curtain Assembly 30 installed in Exit EX from each other, the former is called Curtain Assembly 30A and the latter is called Curtain Assembly 30B as shown in FIG. 1.

Curtain 31 is formed of X-ray absorbing material, such as leaded rubber, to reduce X-ray leakage. In this embodiment, as shown in FIG. 1, Curtain 31 is an endless belt-shaped and is rotatably suspended from Transportation Assist Mechanism 32. Curtain 31 is rotated by Transportation Assist Mechanism 32 in the direction shown by arrows A1 and A2.

Transportation Assist Mechanism 32 has Shaft 32a and Drive Mechanism 32b. Drive Mechanism 32b rotates Shaft 32a clockwise in FIG. 1. As Shaft 32a rotates, Curtain 31 rotates in the direction indicated by arrows A1 and A2 in FIG. 1. Namely, Curtain 31 moves downward (−Z direction) as indicated by arrow A1 upstream (−X side) in Direction D1 and moves upward (+Z direction) as indicated by arrow A2 downstream (+X side) in Direction D1. The lowest part of Curtain 31 moves in the direction along Direction D1, as indicated by arrow X1 in FIG. 1. Transportation Assist Mechanism 32 assists transportation of Baggage BA by rotating Curtain 31 as described above and moving Curtain 31, which came into contact with Baggage BA during transportation, in the direction along Direction D1. Details of the above-described operation of Transportation Assist Mechanism 32 are explained later with reference to FIGS. 2A to 2C.

Baggage Inspection Device 100 further comprises, for example, a CPU, a storage device, a control unit etc. that are not shown in the figures.

Baggage Inspection Device 100 may analyze an image generated by Inspection Unit 10 to automatically determine if Baggage BA contains hazardous objects. By use of such a configuration, Baggage Inspection Device 100 can determine whether hazardous objects are contained in Baggage BA without reliance on human experience and knowledge, and thus baggage inspection can be performed rapidly and accurately.

In general, when curtains for shielding electromagnetic waves are placed at the entrance and exit of the inspection unit, baggage to be inspected may become jammed in the curtains depending on the weight and shape of the baggage. The lighter the weight of the baggage and the higher the height of the baggage, the less the baggage can push the curtain away and often becomes jammed in the curtain.

In contrast, Curtain Assembly 30 of Baggage Inspection Device 100 has Transportation Assist Mechanism 32, which moves Curtain 31 along Direction D1 to assist Baggage BA to push Curtain 31 away, thereby reducing occurrences of jamming of Baggage BA in Curtain 31. As a result, according to Baggage Inspection Device 100, inspection throughput is maintained or improved.

An example of operation of Baggage Inspection Device 100 is described below with reference to FIGS. 2A to 2C (these figures are hereinafter referred to as FIG. 2). In the following description, Curtain 31 is assumed to be constantly rotated by Transportation Assist Mechanism 32 whether Baggage BA is transported or not.

Figure 2A:
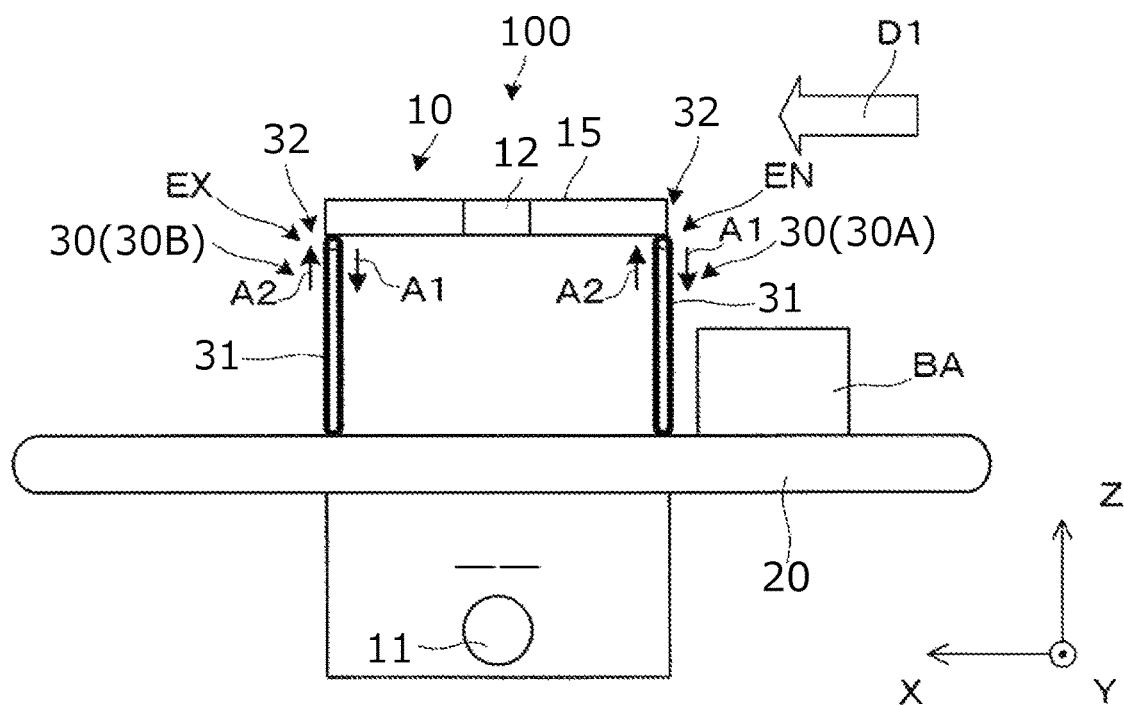
FIG. 2A shows operations of the baggage inspection device according to the first embodiment of this invention.
Figure 2B:
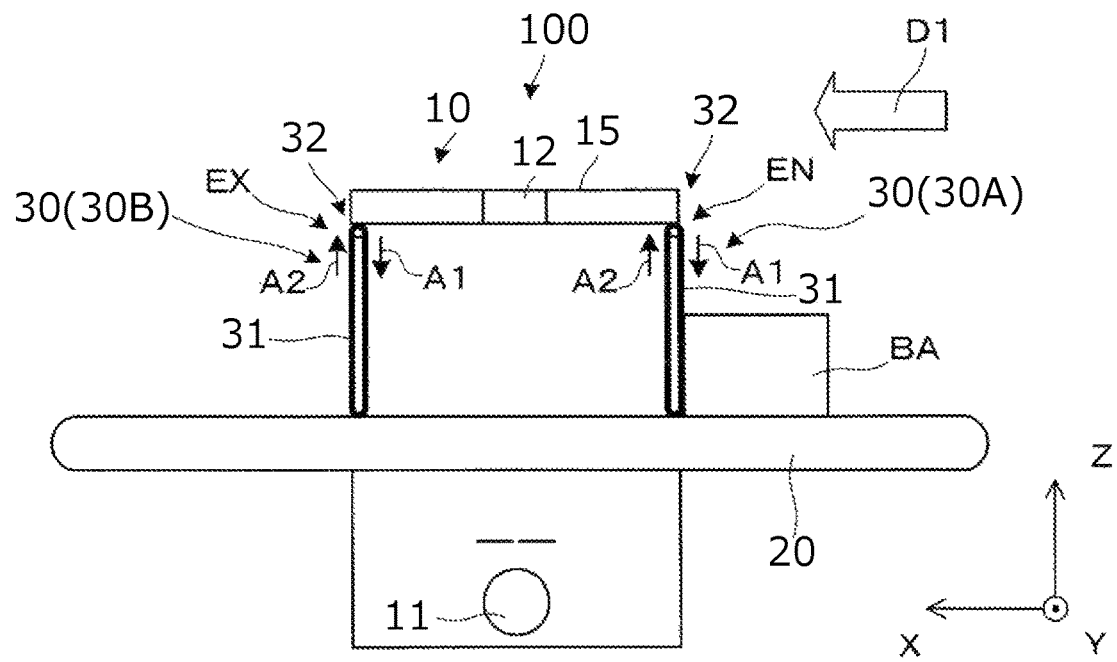
FIG. 2B shows operations of the baggage inspection device according to the first embodiment of this invention.
Figure 2C:
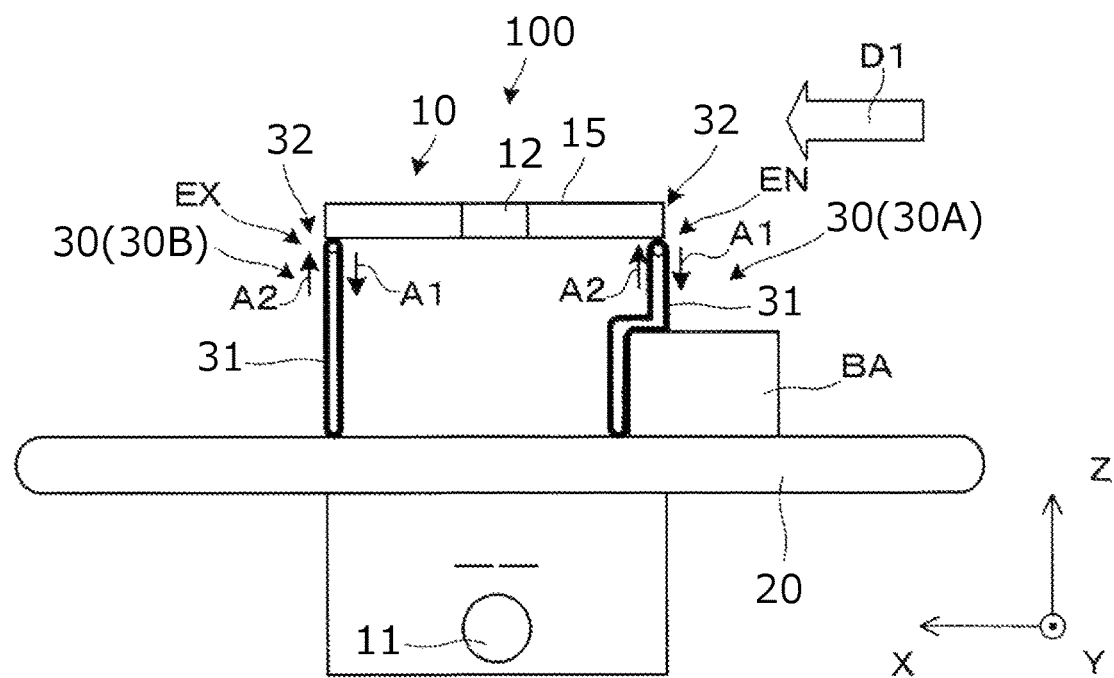
FIG. 2C shows operations of the baggage inspection device according to the first embodiment of this invention.

First, as shown in FIG. 2A, when Baggage BA is placed upstream (−X side) in Direction D1 of Inspection Unit 11, Conveyor 20 transports Baggage BA toward Inspection Unit 11. Then, as shown in FIG. 2B, Baggage BA comes into contact with the upstream (−X side) face of Curtain 31 of Curtain Assembly 30A, which is installed in the Entrance EN of X-ray Shielding Box 15. Curtain 31 moves in the direction along Direction D1 in contact with Baggage BA, as shown in FIG. 2C, so Curtain 31 does not interfere in the transportation of Baggage BA but rather assists transportation. Therefore, even if Baggage BA is light or tall, Baggage BA is unlikely to become jammed in Curtain Assembly 30A.

Curtain Assembly 30B, located downstream (+X side) of Inspection Unit 10 in Direction D1, does not interfere with transportation of Baggage BA, but rather assists it, just like Curtain Assembly 30A. Therefore, Baggage BA does not become jammed in the Curtain Assembly 30B and is smoothly ejected out of X-ray Shielding Box 15.

Figure 3:
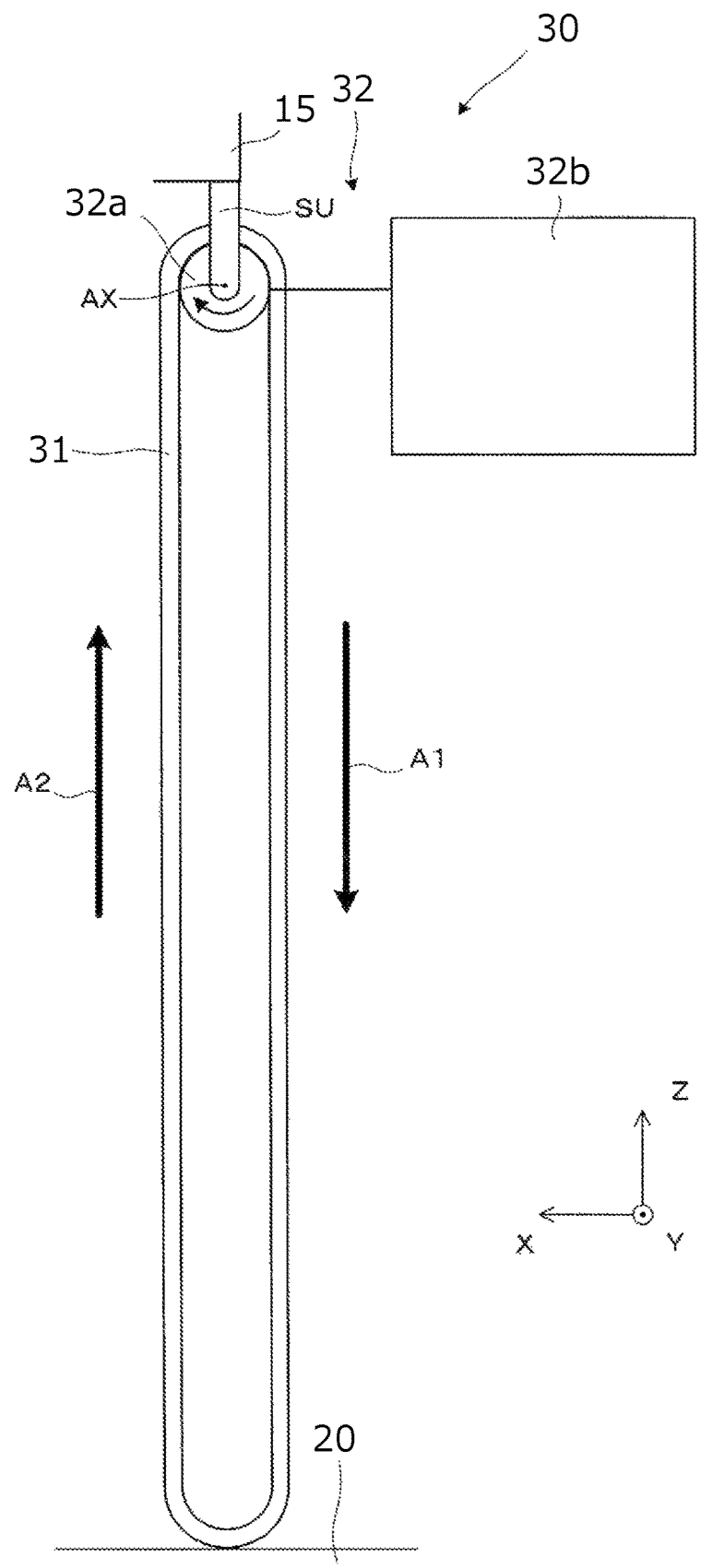
FIG. 3 is a side view of a curtain for shielding the outside from electromagnetic waves of the baggage inspection device according to the first embodiment of this invention.
Figure 4:
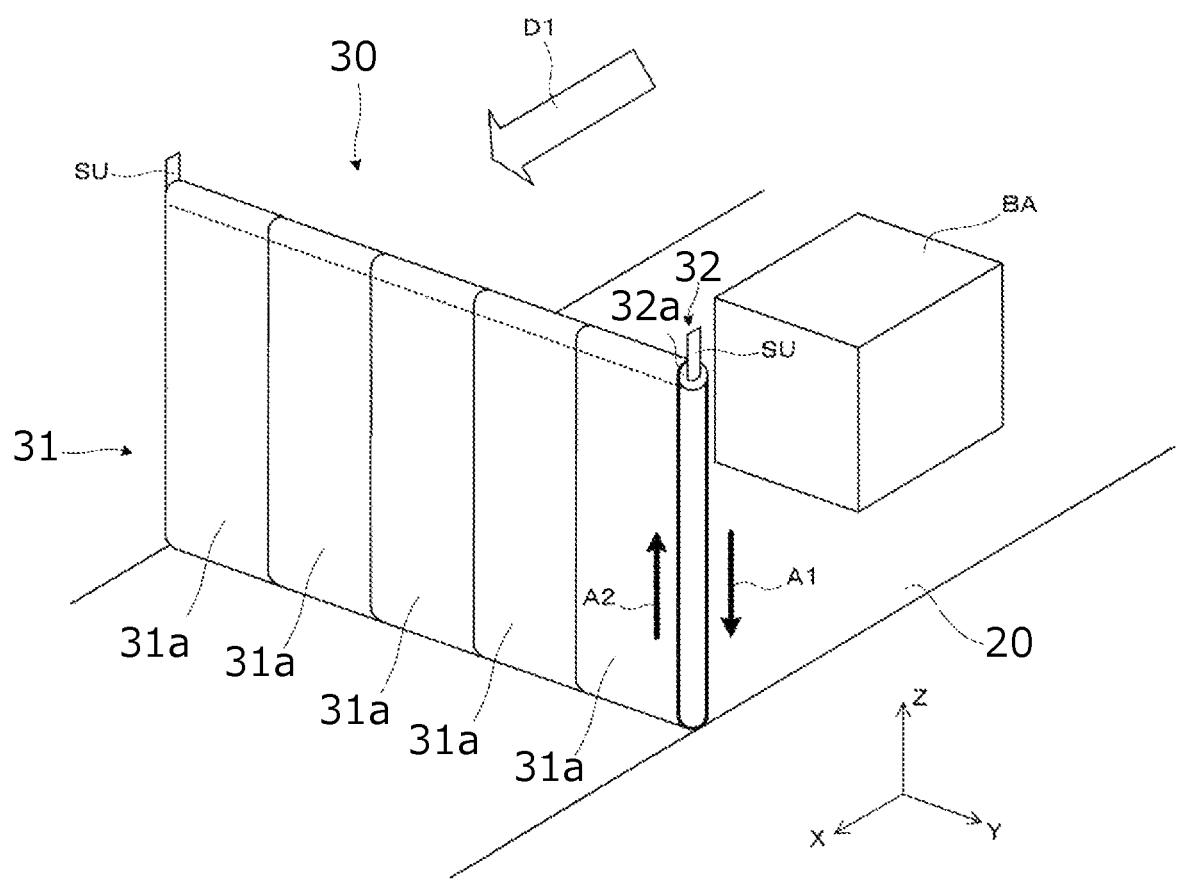
FIG. 4 shows a structure of the curtain for shielding electromagnetic waves according to the first embodiment of this invention.

An example of a configuration of Curtain Assembly 30 is described below with reference to FIGS. 3 and 4. FIG. 3 shows a side view of an example of Curtain Assembly 30. FIG. 4 shows an oblique view of the example of Curtain Assembly 30

As previously mentioned, Curtain Assembly 30 has Curtain 31 and Transportation Assist Mechanism 32. Furthermore, Transportation Assist Mechanism 32 has Shaft 32a that extends in the transverse direction (Y-direction) and Drive Mechanism 32b that rotates Shaft 32a around Center Axis AX. As shown in FIG. 3, Support Member SU is attached to X-ray Shielding Box 15, and Shaft 32a is supported by Support Member SU.

Shaft 32a is, for example, a cylindrical member or a columnar member made of metal or the like. Shaft 32a extends in the widthwise direction of Conveyor 20 (Y-direction) and has a length equal to or greater than the width of Conveyor 20. Shaft 32a is supported by Support Member SU and is rotatable around Center Axis AX. Curtain 31 which has an endless belt shape, is suspended from Shaft 32a.

Drive Mechanism 32b is equipped with a motor, gears, etc. to rotate Shaft 32a around Center Axis AX. In this embodiment, as previously described, Transportation Assist Mechanism 32 rotates Shaft 32a clockwise, as shown in FIG. 1, thereby rotating Curtain 31 in the direction indicated by arrows A1 and A2 in FIG. 1.

As shown in FIG. 4, Curtain 31 has plural Belt-shaped Members 31a. Belt-shaped Members 31a are arranged side by side in the direction of extension of Shaft 32a (Y-direction) with a slight gap provided between them so that they can each rotate independently. Each of Belt-shaped Members 31a receives a force in the rotational direction from Shaft 32a. Belt-shaped Members 31a within an area through which Baggage BA passes move in the direction along Direction D1 in contact with the Baggage BA to assist smooth transportation of Baggage BA.

As described above, Baggage Inspection Device 100 of this embodiment reduces jamming of Baggage BA at Curtain 31. As a result, inspection throughput is maintained or improved.

In other words, according to Curtain Assembly 30 of this embodiment, Curtain 31 reduces jamming of Baggage BA. As a result, throughput of inspection by the Baggage Inspection Device 100 is maintained or improved.

Figure 5:
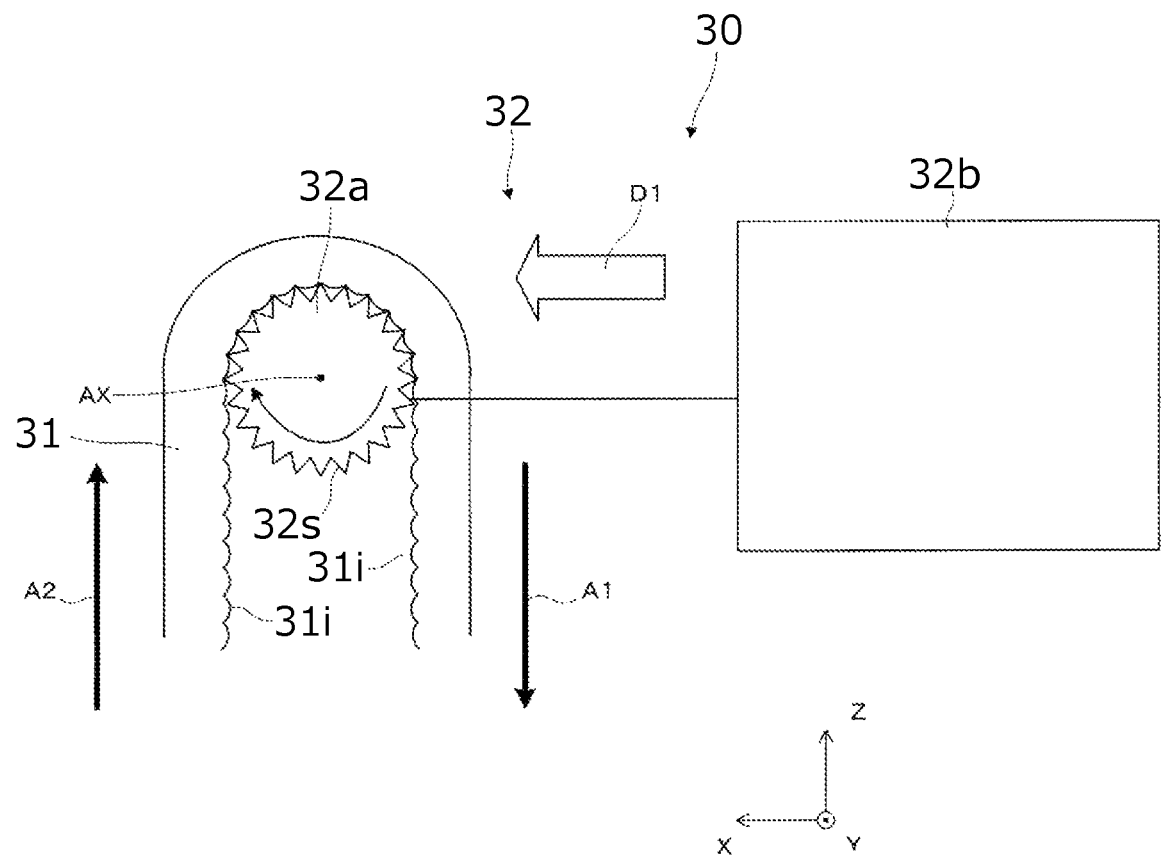
FIG. 5 is a partial enlarged view of the curtain for shielding the outside from electromagnetic waves with a transportation assist mechanism according to a modification of the first embodiment of this invention.

A modification of Transportation Assist Mechanism 32 is described below with reference to FIG. 5. FIG. 5 is an enlarged view of Curtain Assembly 30 of Baggage Inspection Device 100, mainly the Transportation Assist Mechanism 32. A configuration of Baggage Inspection Device 100 of this modification is the same as Baggage Inspection Device 100 of the above-described embodiment, except for shapes of Curtain 31 and Shaft 32a.

As shown in FIG. 5, Shaft 32a of this modification has Surface 32s which has a projection or is gear-shaped, and Curtain 31 of this modification has Inner Surface 31i which has a concave-convex shape. The shape of Surface 32s and the shape of Inner Surface 31i that come into contact with Surface 32s are shapes that engage with each other. Therefore, a force of rotation of Shaft 32*a* is reliably transmitted to Curtain 31. The shapes of Surface 32*s* and Inner Surface 31*i* shown in FIG. 5 are examples and may be modified in various ways.

Figure 6:
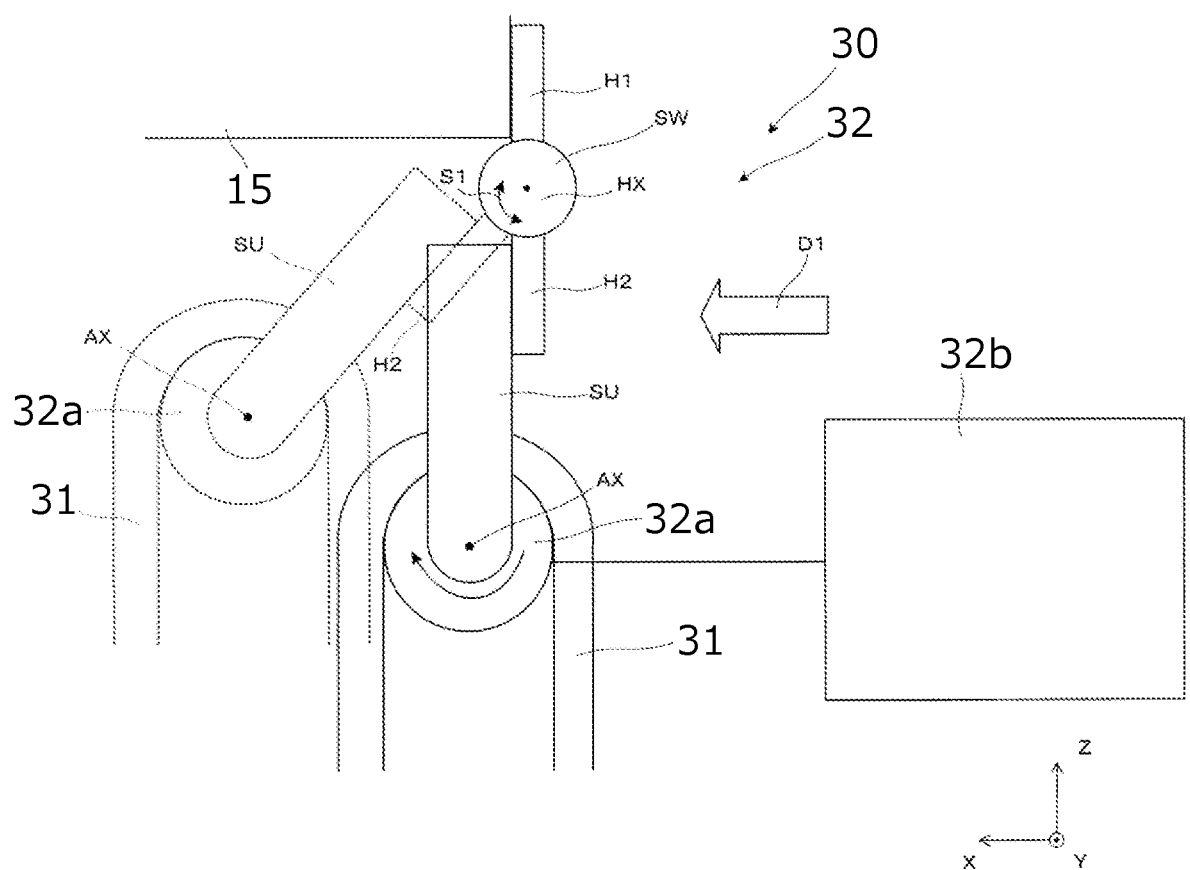
FIG. 6 is a partial enlarged view of the curtain for shielding the outside from electromagnetic waves with a transportation assist mechanism according to a modification of the first embodiment of this invention.

Another modification of Transportation Assist Mechanism 32 is described below with reference to FIG. 6. FIG. 6 is an enlarged view of Curtain Assembly 30 of Baggage Inspection Device 100, mainly the Transportation Assist Mechanism 32. A configuration of Baggage Inspection Device 100 of this modification is the same as Baggage Inspection Device 100 of the above-described embodiment, except that Transportation Assist Mechanism 32 has Swing Mechanism SW that swings Shaft 32*a*.

Swing Mechanism SW has a structure similar to a hinge. Namely, Swing Mechanism SW has Shaft HX, Strip H1, and Strip H2. Shaft HX extends in Y-direction, and Strip H1 and Strip H2 can freely rotate around Shaft HX individually. Strip H1 is attached to X-ray Shielding Box 15 and Strip H2 is attached to Support Member SU. As a result, Transportation Assist Mechanism 32 is caused to swing around Shaft HX as shown by Bidirectional Arrow Si when Baggage BA pushes against Curtain 31. Therefore, Curtain 31 moves slightly in Direction D1 (X-direction) and in Z-direction. As a result, Baggage BA is less likely to jam at Curtain 31.

Second Exemplary Embodiment

A second exemplary embodiment of this invention is described below with reference to FIG. 7. Baggage Inspection Device 200 of this embodiment is the same as Baggage Inspection Device 100 of the first embodiment, except for processing performed by Control Unit 250. The same symbols used in the first embodiment are used for the components that Baggage Inspection Device 200 has in common with Baggage Inspection Device 100. In the following, points in which Baggage Inspection Device 200 differs from Baggage Inspection Device 100 will be explained, and explanations of points in common will be omitted.

Figure 7:
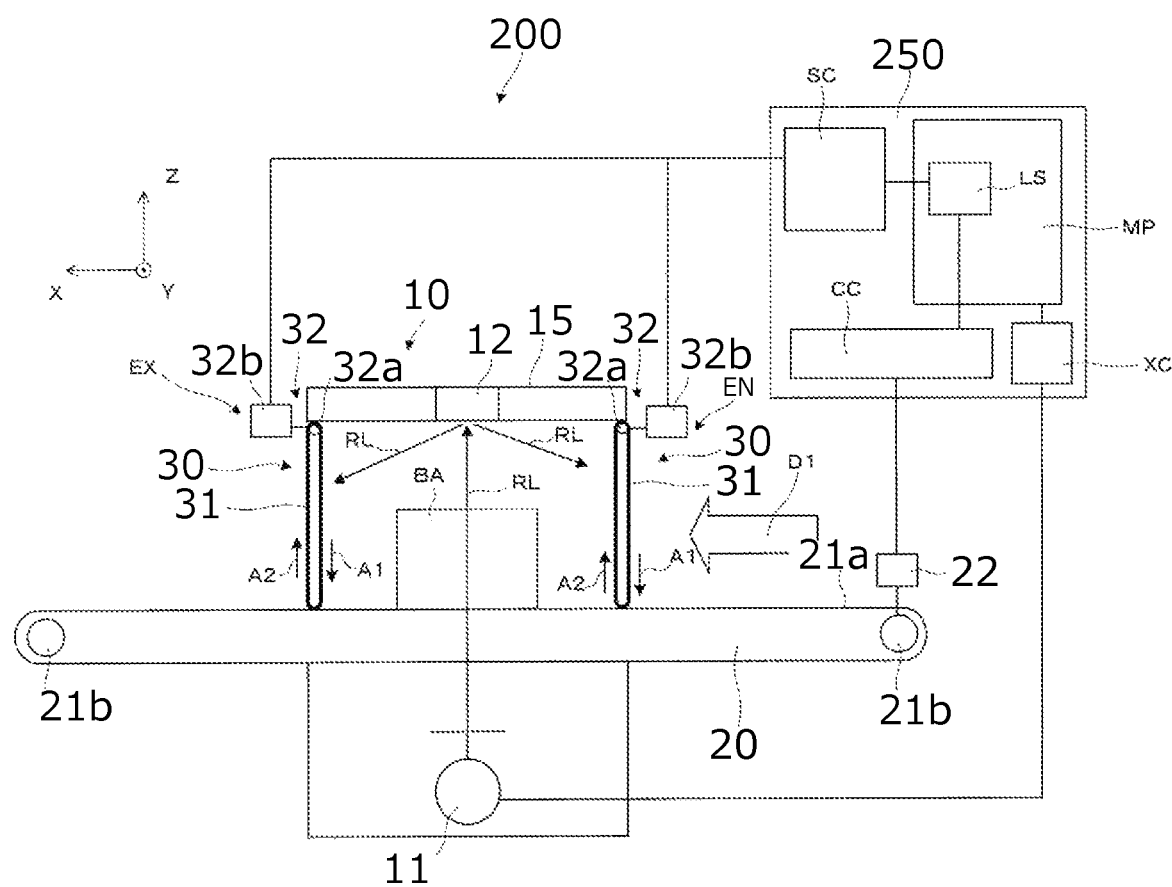
FIG. 7 is a side cross-sectional view of a baggage inspection device according to a second embodiment of this invention.

FIG. 7 is a side cross-sectional view of Baggage Inspection Device 200 that illustrates an example of operation of Baggage Inspection Device 200. Baggage Inspection Device 200 has Control Unit 250 that comprises a CPU, a storage unit, etc. In this embodiment, Control Unit 250 controls Transportation Assist Mechanism 32 so that Shaft 32*a* rotates in conjunction with transportation of Baggage BA by Conveyor 20. Conveyor 20 has Belt 21*a*, a pair of Rollers 21*b*, and Drive Mechanism 22. Belt 21*a* is an endless belt on which Baggage BA is placed. Belt 21*a* is crossed over two Rollers 21*b*. Drive Mechanism 22 rotates each of Rollers 21*b*. Drive Mechanism 22 is connected to Control Unit 250. Drive Mechanism 32*b* of Transportation Assist Mechanism 32 is also connected to Control Unit 250.

Control Unit 250 has Main Controller MP, Shaft Controller SC, Conveyor Controller CC, X-ray Emitter Controller XC and Synchronization Controller LS. Main Controller MP controls operation of each component of Baggage Inspection Device 200. Shaft Controller SC controls operation of Shaft 32*a*. Conveyor Controller CC controls operation of Drive Mechanism 22 of Conveyor 20. X-ray Emitter Controller XC controls operation of X-ray Emitter 11. Synchronization Controller LS controls Shaft Controller SC and Conveyor Controller CC so that their operations are synchronized.

For example, Synchronization Controller LS provides instructions to Shaft Controller SC and Conveyor Controller CC so that a start timing and stop timing of rotation of Shaft 32*a* of Curtain Assembly 30 and a start timing and stop timing of rotation of Rollers 21*b* of Conveyor 20 are synchronized. As a result, while Baggage BA is transported, Curtain 31 rotates, and when Baggage BA is not transported, Curtain 31 does not rotate.

According to Baggage Inspection Device 200, unnecessary rotation of Curtain 31 is minimized.

Third Exemplary Embodiment

A third exemplary embodiment of this invention is described below with reference to FIGS. 8A and 8B. A baggage inspection device of this embodiment is the same as Baggage Inspection Device 100 of the first embodiment, except that Transportation Assist Mechanism 32 has no drive mechanism and Curtain 31 rotates freely. The same symbols as used in the first embodiment are used for those components that the baggage inspection device of this embodiment has in common with Baggage Inspection Device 100. In the following, points in which the baggage inspection device of this embodiment differs from Baggage Inspection Device 100 will be explained, and explanations of points in common will be omitted.

Figure 8A:
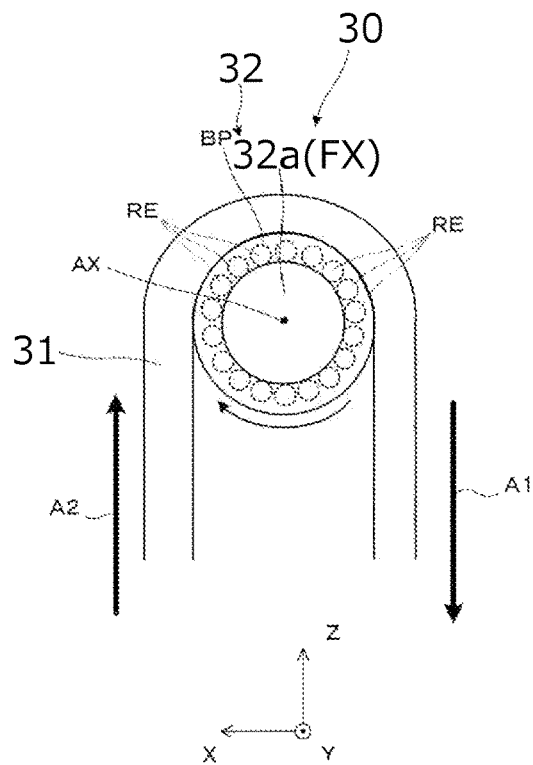
FIG. 8A is a partial enlarged view of an example of transportation assist mechanism of a baggage inspection device according to a third embodiment of this invention.

FIG. 8A is a partially enlarged view of Transportation Assist Mechanism 32 of the baggage inspection device of this embodiment. In this embodiment, Shaft 32*a* of Transportation Assist Mechanism 32 is a fixed shaft that does not rotate, and Transportation Assist Mechanism 32 has Bearing BP mounted around Shaft 32*a*. Bearing BP is a ball bearing with plural Balls RE. Curtain 31 is suspended outside Bearing BP. Smooth rotation of Bearing BP against Shaft 32*a* allows Curtain 31 to rotate freely. When Baggage BA comes into contact with Curtain 31 and pushes against Curtain 31, a force imparted by Baggage BA causes Curtain 31 to rotate.

Figure 8B:
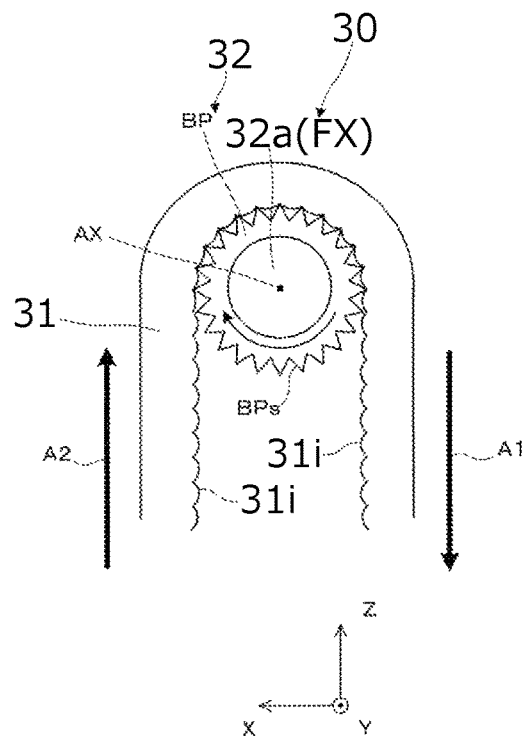
FIG. 8B is a partial enlarged view of an example of transportation assist mechanism of a baggage inspection device according to the third embodiment of this invention.

The baggage inspection device of this embodiment may have Curtain 31 and Bearing BP that engage with each other as shown in FIG. 8B. In this modification, Outer Surface BPs of Bearing BP is projecting or gear-shaped, and Inner Surface 31*i* of Curtain 31 is uneven, so that Outer Surface BPs of Bearing BP and Inner Surface 31*i* of Curtain 31 engage with each other.

The baggage inspection device of this embodiment may have Swing Mechanism SW shown in FIG. 6.

According to this embodiment, occurrence of jams of Baggage BA at Curtain 31 is reduced by a configuration that is simpler than the configuration of the first embodiment.

Modified Examples of First, Second or Third Embodiment

The first, second and third embodiments described above are exemplary implementations of this invention, and may be modified in various ways. The following are modified examples of the first, second or third embodiment. Two or more of the following modified examples may be combined as needed.

Figure 9:
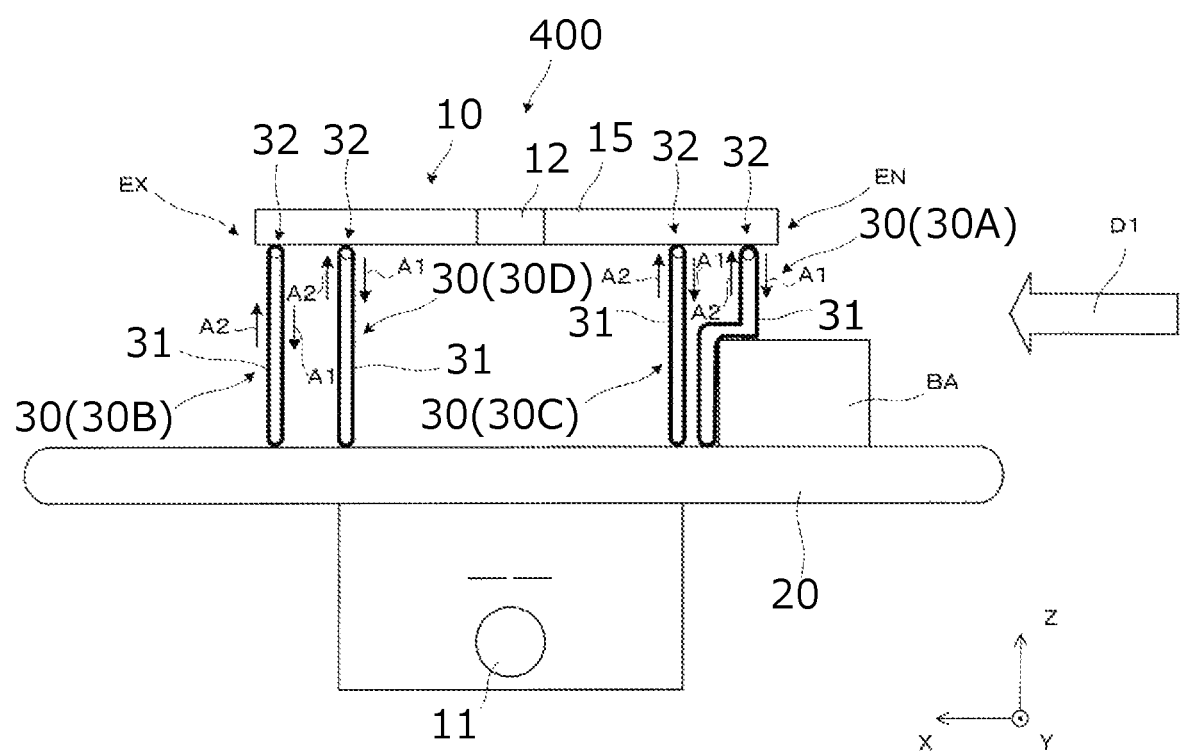
FIG. 9 is a side section view of a baggage inspection device according to a modification of the third embodiment of this invention.

(1) In the above-described embodiments, a number of Curtain Assemblies 30 located at Entrance EN and at Exit EX is one respectively. The number of Curtain Assemblies 30 located at Entrance EN and at Exit EX may be two or more. For example, as shown in FIG. 9, two Curtain Assemblies 30, i.e. Curtain Assembly 30A and Curtain Assembly 30C, may be placed in Entrance EN and two Curtain Assemblies 30, i.e. Curtain Assembly 30D and Curtain Assembly 30B, may be placed in Exit EX. Length (width) of each of Belt-shaped Members 31*a* (see FIG. 4) of Curtain Assembly 30A in the transverse direction (Y-direction) and Length (width)

of each of Belt-shaped Members 31a of Curtain Assembly 30C in the transverse direction (Y-direction) may be different from each other. Similarly, Length (width) of each of Belt-shaped Members 31a of Curtain Assembly 30C in the transverse direction (Y-direction) and Length (width) of each of Belt-shaped Members 31a of Curtain Assembly 30B in the transverse direction (Y-direction) may be different from each other. In this case, positions of gaps between two adjacent Belt-shaped Members 31a in Y direction are different in two adjacent Curtain Assemblies 30, i.e. Curtain Assemblies 30A and 30C, or Curtain Assemblies 30D and 30B. As a result, leakage of X-rays is reduced.

(2) In the above-described embodiments, Curtain 31 consists of plural Belt-shaped Members 31a. Alternatively, curtain 31 may consist of a single member. In the above-described embodiments, one Shaft 32a rotates plural Belt-shaped Members 31a. Alternatively, each of Belt-shaped Members 31a may be rotated by different Shaft 32a.

(3) Based on detection results of one or more sensors, a period during which Drive Mechanism 32b rotates Shaft 32a may be determined. For example, the baggage inspection device may have a sensor that detects force applied to Shaft 32a, and when a magnitude of the force detected by the sensor reaches a threshold value, Baggage BA is considered to be jammed in Curtain 31, and Drive Mechanism 32b may start rotating Shaft 32a.

(4) Shapes, sizes, materials, etc. of Curtain 31 are not limited to those described in the above-mentioned embodiments. For example, a material of Curtain 31 is not limited to leaded rubber, but other materials may be employed as long as they have X-ray shielding properties.

(5) Conveyor 20 is not limited to a belt conveyor illustrated in FIG. 7. Whole or part of Conveyor 20 may be configured as conveying mechanism not using a conveyor belt.

(6) Event venues, etc., may have plural entrances. The baggage inspection device of this invention may be placed at each of the plural entrances. In such a case, plural baggage inspection devices may be integrally managed by one or more administrators. For example, one inspector may be stationed at each of the entrances, and each inspector may be managed by plural managers, e.g., from a control room.

(7) In addition to the inspection of Baggage BA by the baggage inspection device according to this invention, an inspection of objects worn by a passenger who carries Baggage BA may be performed by a body inspection device.

(8) Methods by which Inspection Unit 10 inspects Baggage BA are not limited to a method using X-rays. For example, Inspection Unit 10 may inspect Baggage BA using electromagnetic waves other than X-rays, or it may inspect Baggage BA in a manner that does not use electromagnetic waves.

Fourth Exemplary Embodiment (Configuration of Baggage Inspection Device)

Figure 10:
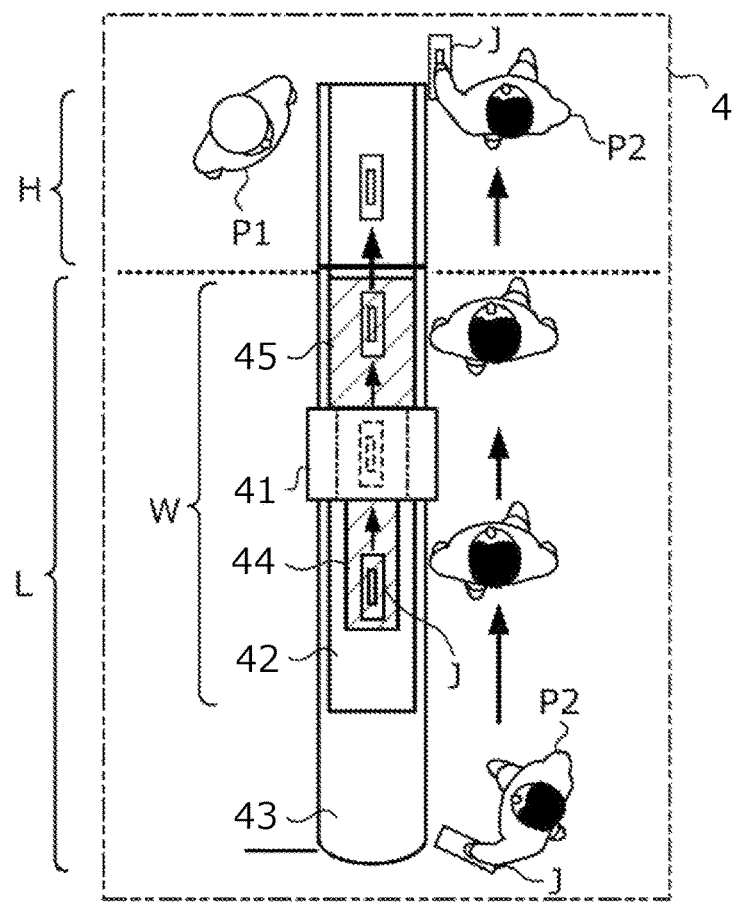
FIG. 10 shows a configuration of a baggage inspection device according to a fourth embodiment of this invention.

FIG. 10 shows an example of a configuration of Baggage Inspection Device 4 according to a fourth exemplary embodiment of this invention. Baggage Inspection Device 4 is a device that inspects Baggage J of Passenger P2 when Passenger P2 is entering a place where services are provided to Passenger P2, such as a transportation facility, a concert hall, public hall, etc.

FIG. 10 shows Baggage Inspection Device 4 viewed from above. Baggage Inspection Device 4 transports and inspects Baggage J of Passenger P2 who is about to enter from Outer Space L to Inner Space H in the direction shown by arrows in FIG. 10. Baggage Inspection Device 4 comprises Inspection Unit 41, Conveyor 42 and Loading Table 43.

Inspection Unit 41 continuously inspects Baggage J transported by Conveyor 42 by, for example, emitting X-rays. Inspection Unit 41 has an entrance on the lower side and an exit on the upper side in FIG. 10.

Inspection Unit 41 has a cover that covers from above the area where Baggage J is inspected. A result of inspection of Baggage J performed by Inspection Unit 41 is shown, for example, on a display not shown in FIG. 1, and checked by Inspector P1.

As shown in FIG. 10, Conveyor 42 transports Baggage J from Outer Space L to Inner Space H. Baggage J, which is placed by Passenger P2 upstream of Inspection Unit 41, passes the entrance of Inspection Unit 41, the inspection area in Inspection Unit 41, and the exit of Inspection Unit 41. Conveyor 42 is, for example, a belt conveyor. Conveyor 42 starts or stops operation according to operations that Inspector P1 makes on a control panel, which is not shown in FIG. 1.

Conveyor 42 may consist of a single belt conveyor, or it may consist of plural belt conveyors. Conveyor 42 may, for example, comprise a conveyor conveying Baggage J in an area upstream of Inspection Unit 41, a conveyor conveying Baggage J in an area inside Inspection Unit 41, and a conveyor conveying Baggage J in an area downstream of Inspection Unit 41, and a control unit to control these conveyors to operate in coordination.

Loading Table 43 is a table on which Baggage J is placed before being transported to Conveyor 42. Loading Table 43 is placed, for example, adjacent to the upstream end of Conveyor 42. Baggage J placed on Loading Table 43 is pushed toward Conveyor 42 by Passenger P2, and then conveyed by Conveyor 42 to Inspection Unit 41.

The area of the transport path of Conveyor 42 upstream from the entrance of Inspection Unit 41 in the transport direction is covered from above by Cover 44. The area of the transport path of Conveyor 42 downstream from the exit of Inspection Unit 41 in the transport direction is covered from above by Cover 45. In this embodiment, Cover 44, the cover of Inspection Unit 41 and Cover 45 constitute an anti jamming mechanism that prevents Baggage J transported by Conveyor 42 from a jam. Cover 44, the cover of Inspection Unit 41 and Cover 45 are hereinafter referred to as a "group of covers." The group of covers forms Space W with Conveyor 42. Each of Cover 44 and Cover 45 is made of transparent material, and the inside of Cover 44 and Cover 45 can be seen from the outside.

Figure 11:
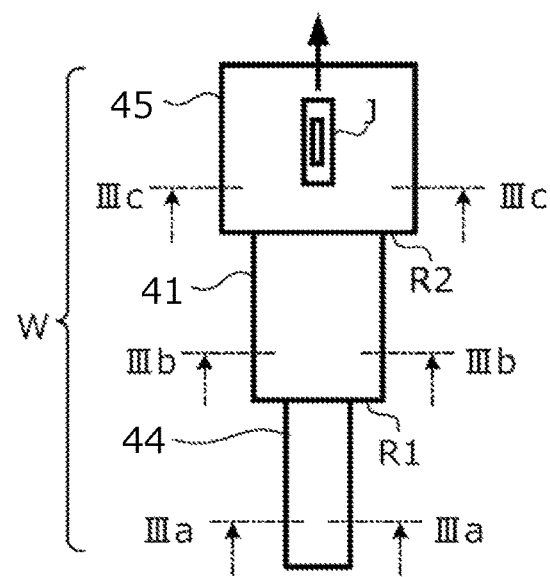
FIG. 11 shows a space formed by a cover of a baggage inspection device configuration according to the fourth embodiment of this invention.

FIG. 11 shows a top view of Space W formed between the group of covers and the conveyor surface of Conveyor 42. The shape of Space W shown in FIG. 11 is deformed so that its feature is prominent.

Line IIIa-IIIa in FIG. 11 indicates a position of a plane perpendicular to the transport direction and intersecting a portion of Space W that is formed by Cover 44 and Conveyor 42. Line IIIb-IIIb in FIG. 11 indicates a position of a plane perpendicular to the transport direction and intersecting a portion of Space W that is formed by the cover of Inspection Unit 41 and Conveyor 42. Line IIIc-IIIc in FIG. 11 indicates a position of a plane perpendicular to the transport direction and intersecting a portion of Space W that is formed by Cover 45 and Conveyor 42.

Figure 12A:
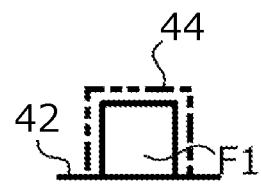
FIG. 12A shows a cross section of the space formed by the cover according to the fourth embodiment of this invention.
Figure 12B:
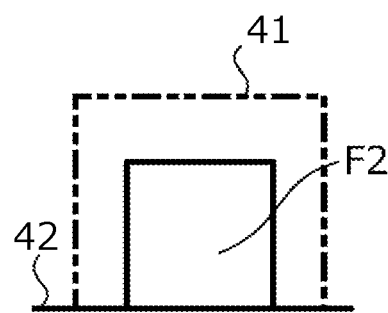
FIG. 12B shows a cross section of the space formed by the cover according to the fourth embodiment of this invention.
Figure 12C:
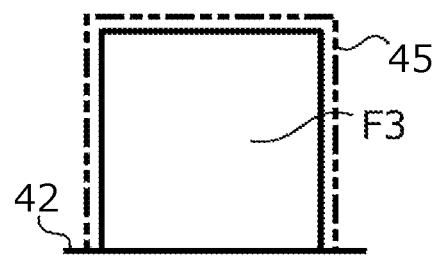
FIG. 12C shows a cross section of the space formed by the cover according to the fourth embodiment of this invention.

FIGS. 12A to 12C (hereafter referred to as FIG. 12) show cross sections of Space W.

FIG. 12A is a view of Cross-section F1 of Space W in the plane of the position indicated by Line IIIa-IIIa in FIG. 11, looking in the transport direction. FIG. 12B is a view of Cross-section F2 of Space W in the plane of the position indicated by Line IIIb-IIIb in FIG. 11, looking in the transport direction. FIG. 12C is a view of Cross-section F3 of Space W in the plane of the position indicated by Line IIIc-IIIc in FIG. 11, looking in the transport direction.

As shown in FIG. 11, Cross-section F2 is more downstream than Cross-section F1 in the transport direction, and Space W in Cross-section F2 is larger than Space W in Cross-section F1 as shown in FIG. 12. As shown in FIG. 11, Cross-section F3 is more downstream than Cross-section F2 in the transport direction, and Space W in Cross-section F3 is larger than Space W in Cross-section F2 as shown in FIG. 12.

In other words, a cross-section of Space W perpendicular to the transport direction of Baggage J expands downstream in the transport direction of Baggage J.

Section R1 shown in FIG. 11 is the boundary between Cover 44 and Inspection Unit 41. Section R2 shown in FIG. 11 is the boundary between Inspection Unit 41 and Cover 45. The cross section of Space W expands stepwise in Sections R1 and R2. Namely, Space W shown in FIG. 11 has sections that expand stepwise.

Figure 13:
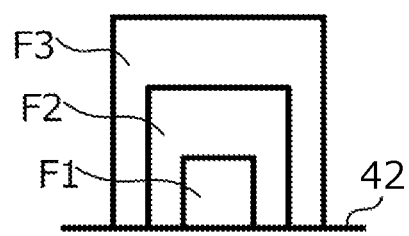
FIG. 13 shows a cross section of the space formed by the cover in a transport direction of baggage to be inspected according to the fourth embodiment of this invention.

FIG. 13 shows Cross-sections F1, F2 and F3 in the transport direction. As shown in FIG. 13, when viewed in the transport direction, Cross-section F1 is located inside Cross-section F2, and both Cross-sections F1 and F2 are located inside Cross-section F3. That is, of two cross-sections of Space W described above, the upstream cross section in the transport direction is located inside the downstream cross-section.

(Operation of Baggage Inspection Device)

An example of operation of Baggage Inspection Device 4 is described below. Inspector P1 must respond to Passenger P2 coming into Inner Space H from Outer Space L according to a result of inspection of Baggage J. Therefore, as shown in FIG. 10, Inspector P1 stands on the exit side of Inspection Unit 41.

Passenger P2 places Baggage J on Loading Table 43 in Outer Space L, then slides Baggage J to Conveyor 42. After Passenger P2 releases Baggage J, Passenger P2 moves to Inner Space H to pick up Baggage J inspected and seen as not containing a hazardous object.

Conveyor 42 transports Baggage J, which is moved from Loading Table 43 to the conveyor surface of Conveyor 42 Passenger P2, to the entrance of Inspection Unit 41.

Figure 14A:
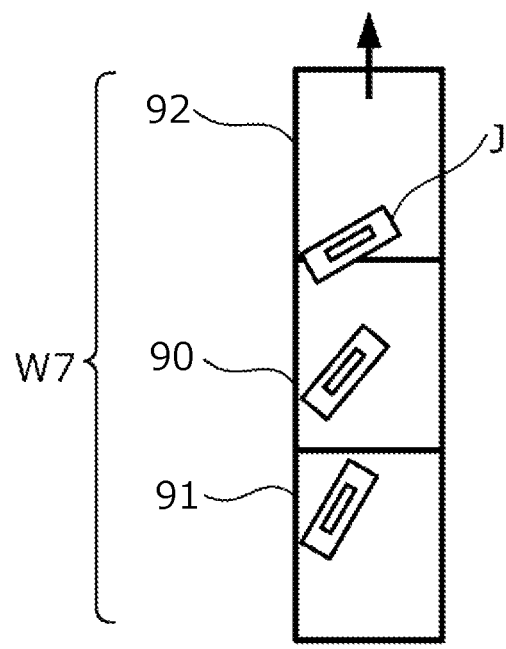
FIG. 14A shows a top view of baggage transported in the space formed by the cover according to the fourth embodiment of this invention.
Figure 14B:
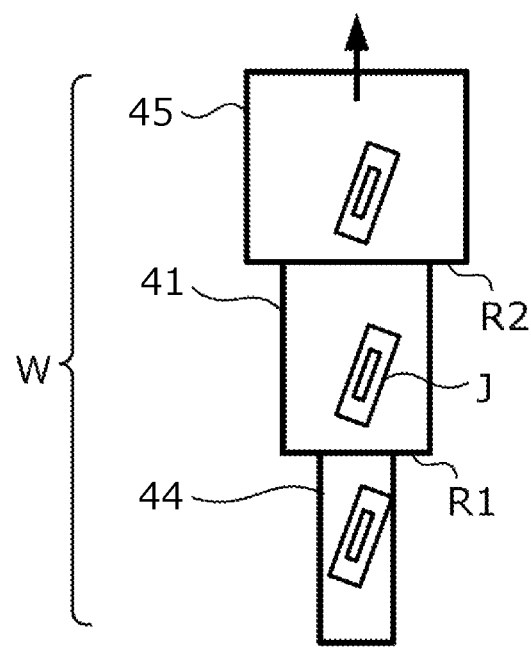

FIGS. 14A and 14B (hereafter referred to as FIG. 14) show a top view of Baggage J being transported inside Space W. Although the covers of Inspection Unit 41 and Inspection Unit 90 (explained later) are not transparent, FIG. 14 shows Baggage J being transported inside the covers of Inspection Unit 41 and Inspection Unit 90.

FIG. 14A shows an example of behavior of Baggage J when being transported in Space W7 of a baggage inspection device that has a group of covers with a shape different from that of Baggage Inspection Device 4. The baggage inspection device shown in FIG. 14A has Inspection Unit 90, Cover 91 and Cover 92.

In the baggage inspection device shown in FIG. 14A, the area of the transport path upstream from the entrance of Inspection Unit 90 in the transport direction is covered from above by Cover 91, and the area of the transport path downstream from the exit of Inspection Unit 90 in the transport direction is covered from above by Cover 92.

Each of Cover 91 and Cover 92 is made of transparent material, and the inside of Cover 91 and Cover 92 can be seen from the outside. Cover 91, the cover of Inspection Unit 90 and Cover 92 forms Space W7 with the conveyor.

A shape and size of a cross-section of Space W7 is the same at any position in the transport direction. Namely, a cross-section of Space W7 perpendicular to the transport direction does not expand downstream in the transport direction.

Because of the above-explained shape of Space W7, once Baggage J passing inside Space W7 comes in contact with the inner surface of either Cover 91, the cover of Inspection Unit 90 or Cover 92, Baggage J may continue to remain in contact with the inner surface until Baggage J moves out of Space W7. While in contact with the inner surface, Baggage J is subjected to a force due to friction from the inner surface that interferes with the transportation of Baggage J. Therefore, according to the baggage inspection device shown in FIG. 14A, Baggage J may get caught on the inner surface and become jammed in Space W7.

On the other hand, Space W of Baggage Inspection Device 4 shown in FIG. 14B has a cross-section perpendicular to the transport direction that expands downstream in the transport direction.

Therefore, as shown in FIG. 14B, even if Baggage J comes into contact with the inner surface of Cover 44, Baggage J is unlikely to make contact with the inner surface of the cover of Inspection Unit 41, since the cross-section of Space W perpendicular to the transport direction expands when Baggage J passes Section R1.

Similarly, even if Baggage J comes into contact with the inner surface of the cover of Inspection Unit 41, Baggage J is unlikely to make contact with the inner surface of Cover 45, since the cross-section of Space W perpendicular to the transport direction expands when Baggage J passes Section R2.

In other words, according to Baggage Inspection Device 4, since the cross-section of Space W perpendicular to the transport direction expands downstream in the transport direction, Baggage J is not likely caught on the inner surface and jam in Space W.

Modified Examples of Fourth Embodiment

The fourth embodiment described above is an exemplary implementation of this invention, and may be modified in various ways. The following are modified examples of the fourth embodiment. Two or more of the following modified examples may be combined as needed.

(1) The configuration of the baggage inspection device, the shapes and sizes of the components of the baggage inspection device, etc. shown in the above description of the fourth embodiment are examples, and they may be modified in various ways.

(2) Baggage Inspection Device 4 may not comprise Loading Table 43. The location of Loading Table 43 is not limited to the location adjacent to the upstream end of Conveyor 42. For example, Loading Table 43 may be located adjacent to the side of Conveyor 42. Loading Table 43 may have rollers to facilitate Passenger P2 to move Baggage J to Conveyor 42. Loading Table 43 may be positioned to cover the upstream end of Conveyor 42 in the transport direction.

(3) Baggage Inspection Device 4 may check whether Passenger P2 is allowed to enter Inner Space H before Passenger P2 enters Inner Space H from Outer Space L.

In this modification, Baggage Inspection Device 4 may comprise a ticket gate machine that has a communication unit that performs near field communications with an external device such as an IC (Integrated Circuit) card in accordance with, for example, the communication protocol defined in ISO/IEC 18092 and a gate that opens and closes based on data that the communication unit receives from the external device. Passenger P2 carries an IC card that stores data indicating information on Passenger P2, such as data identifying Passenger P2, data indicating an amount of electronic money charged to the IC card, etc. The ticket gate machine communicates with the IC card when Passenger P2 brings the IC card close to a certain part of the ticket gate machine. The ticket gate device determines whether Passenger P2 is allowed to enter Inner Space H based on data received from the IC card. The ticket gate machine closes the gate to prevent Passenger P2 from entering Inner Space H when it determines that Passenger P2 is not allowed to enter Inner Space H.

(4) In the above-described fourth embodiment, Space W has Sections R1 and R2 where a cross-section of Space W perpendicular to the transport direction expands stepwise in the transport direction. In addition to the sections, Space W may have one or more sections where the cross-section of Space W perpendicular to the transport direction continuously expands in the transport direction.

Figure 15:
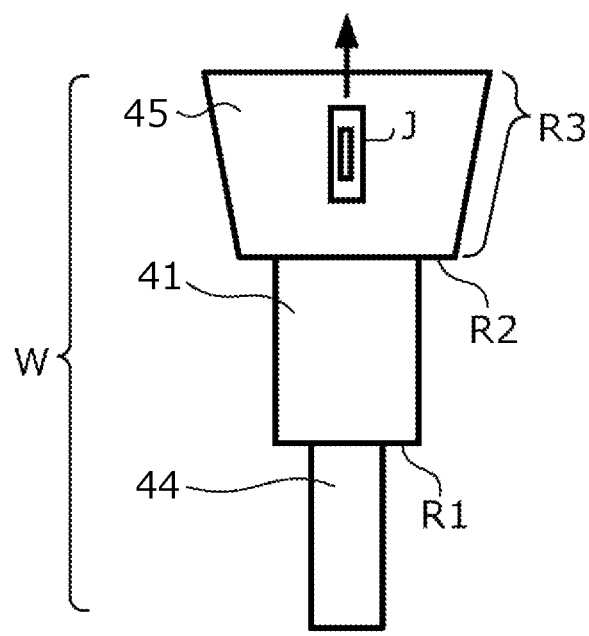
FIG. 15 shows an example of the space formed by the cover with a section that continuously expands in the transport direction of the baggage according to a modification of the fourth embodiment of this invention.

FIG. 15 shows an example of Space W with a continuously expanding section perpendicular to the transport direction. Space W shown in FIG. 15 has Section R3 formed by Cover 45 and Conveyor 42 where the cross-section of Space W perpendicular to the transport direction continuously expands in the transport direction.

Even if Baggage J comes into contact with the inner surface of Cover 45 in Section R3 of Space W shown in FIG. 15, Baggage J quickly leaves the inner surface of Cover 45 as it is transported in the transport direction. Therefore, Baggage J is less likely to jam in Space W.

(5) Space W may not have a section where the cross-section of Space W perpendicular to the transport direction expands stepwise in the transport direction, and have one or more sections where the cross-section of Space W continuously expands in the transport direction.

Figure 16:
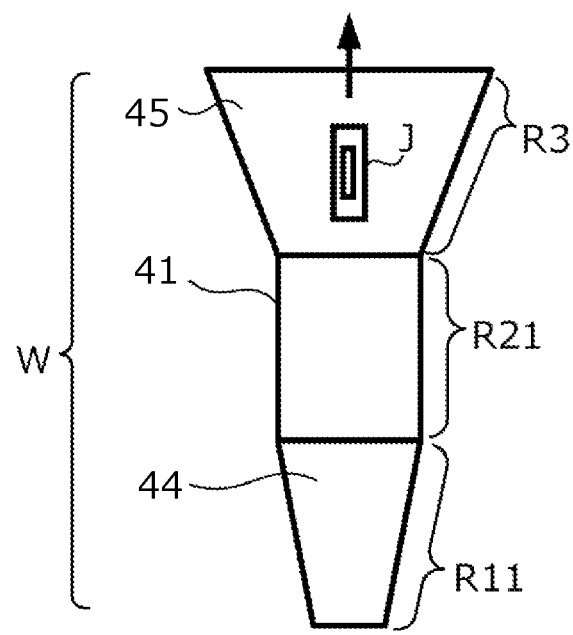
FIG. 16 shows an example of the space formed by the cover with a section that does not expand stepwise in the transport direction of the baggage according to a modification of the fourth embodiment of this invention.

FIG. 16 shows an example of Space W that has sections where the cross-section of Space W perpendicular to the transport direction continuously expands in the transport direction, and does not have a section where the cross-section of Space W perpendicular to the transport direction expands stepwise in the transport direction. Space W shown in FIG. 16 has Section R3 formed by Cover 45 and Conveyor 42 and Section R11 formed by Cover 44 and Conveyor 42 where the cross-section of Space W perpendicular to the transport direction continuously expands in the transport direction.

Space W shown in FIG. 16 also has Section R21 formed by Cover 41 and Conveyor 42 where the cross-section of Space W perpendicular to the transport direction neither expands nor contracts in the transport direction. In other words, Space W shown in FIG. 16 is formed by sections that continuously expand and a section that neither expands nor contracts, and does not have a section that expands stepwise.

Even if Baggage J comes into contact with the inner surface of Cover 44, Baggage J quickly leaves the inner surface of Cover 44 as it is transported in the transport direction.

Even if Baggage J comes into contact with the inner surface of the cover of Inspection Unit 41, Baggage J leaves the inner surface of the cover of Inspection Unit 41 when Baggage J reaches Section R3.

In short, if Space W has at least one of a section that continuously expands in the transport direction and a section that expands stepwise in the transport direction, Baggage J is less likely to jam in Space W than if it does not have those sections.

(6) Space W may consist only of a section that continuously expands in the transport direction.

Figure 17:
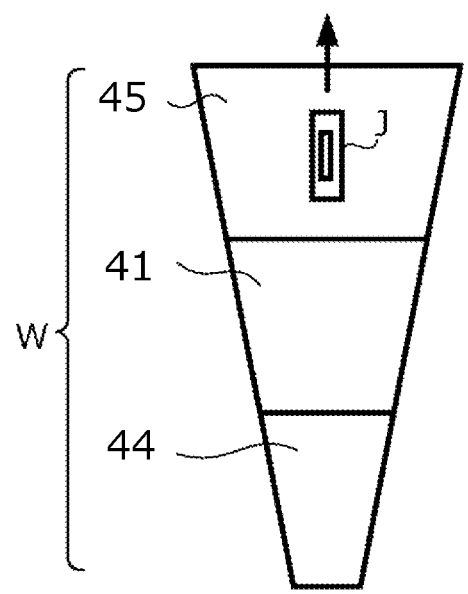
FIG. 17 shows an example of the space formed by the cover that consists only of sections that continuously expand in the transport direction of the baggage according to a modification of the fourth embodiment of this invention.

FIG. 17 shows an example of Space W that consists only of a section where the cross-section of Space W perpendicular to the transport direction continuously expands in the transport direction. Cover 44 shown in FIG. 17 is continuous with the cover of Inspection Unit 41 at the downstream end in the transport direction without any step. Cover 45 shown in FIG. 17 is continuous with the cover of Inspection Unit 41 at the upstream end in the transport direction without any step.

The cross-section of Space W shown in FIG. 17 perpendicular to the transport direction continuously expands throughout the entire area in the transport direction. Therefore, even if Baggage J comes into contact with the inner surface of Space W, it quickly leaves the inner surface as it is transported.

Figure 18:
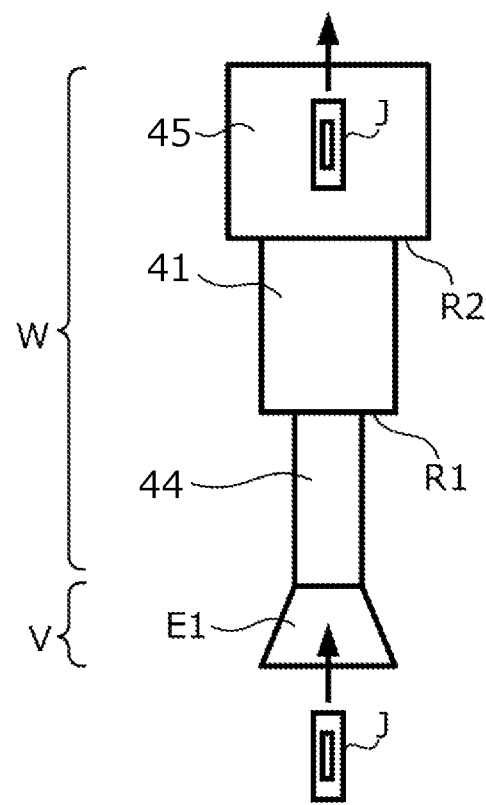
FIG. 18 shows an example of a guide member placed at an entrance of the space according to a modification of the fourth embodiment of this invention.

(7) FIG. 18 shows an example of a baggage inspection device according to a modification of the fourth embodiment, that has Guide Member E1. Guide Member E1 is located upstream of the entrance to Space W, and guides Baggage J to the entrance along the transport direction.

Guide Member E1 covers the transport path of Conveyor 42 from above in the area upstream of Cover 44 in the transport direction.

As shown in FIG. 18, Space V formed between Guide Member E1 and Conveyor 42 has a cross-section perpendicular to the transport direction that continuously contracts in the transport direction. The downstream end of Guide Member E1 is continuous with the upstream end of Cover 44.

When Baggage J contacts Guide Member E1, Baggage J moves along the inner surface of Guide Member E1 in Space V and the position of Baggage J in the left-right direction is adjusted before Baggage J reaches the upstream end of Cover 44. As a result, Baggage J can smoothly enter Space W.

As in the case of the fourth embodiment described above, Space W expands in the transport direction in this modification.

(8) Cover 44 and Cover 45 may be formed, for example, of woven wire. In this case, the inside of Cover 44 and Cover 45 are also visible from the outside.

Fifth Exemplary Embodiment

Baggage Inspection Device 50 according to a fifth exemplary embodiment of this invention is explained below with reference to drawings.

Figure 19:
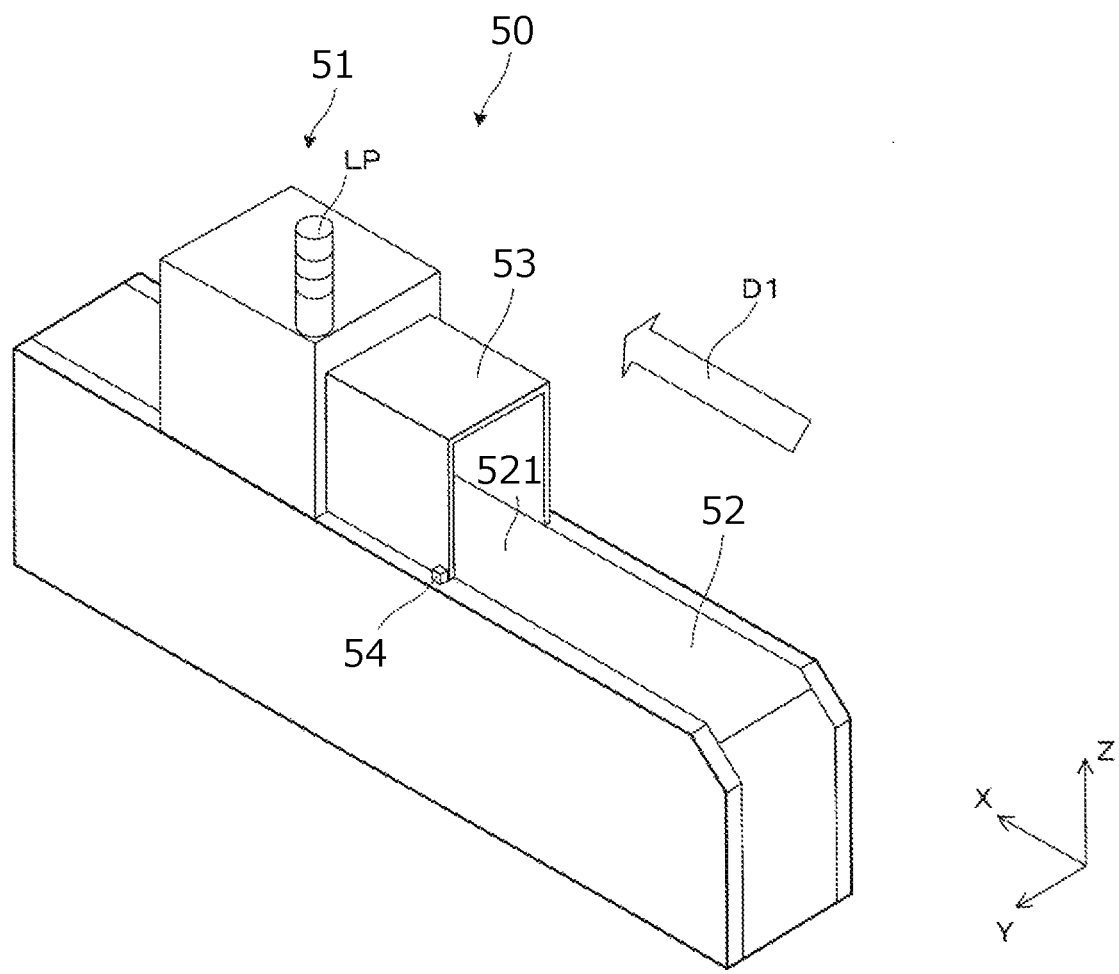
Figure 20:
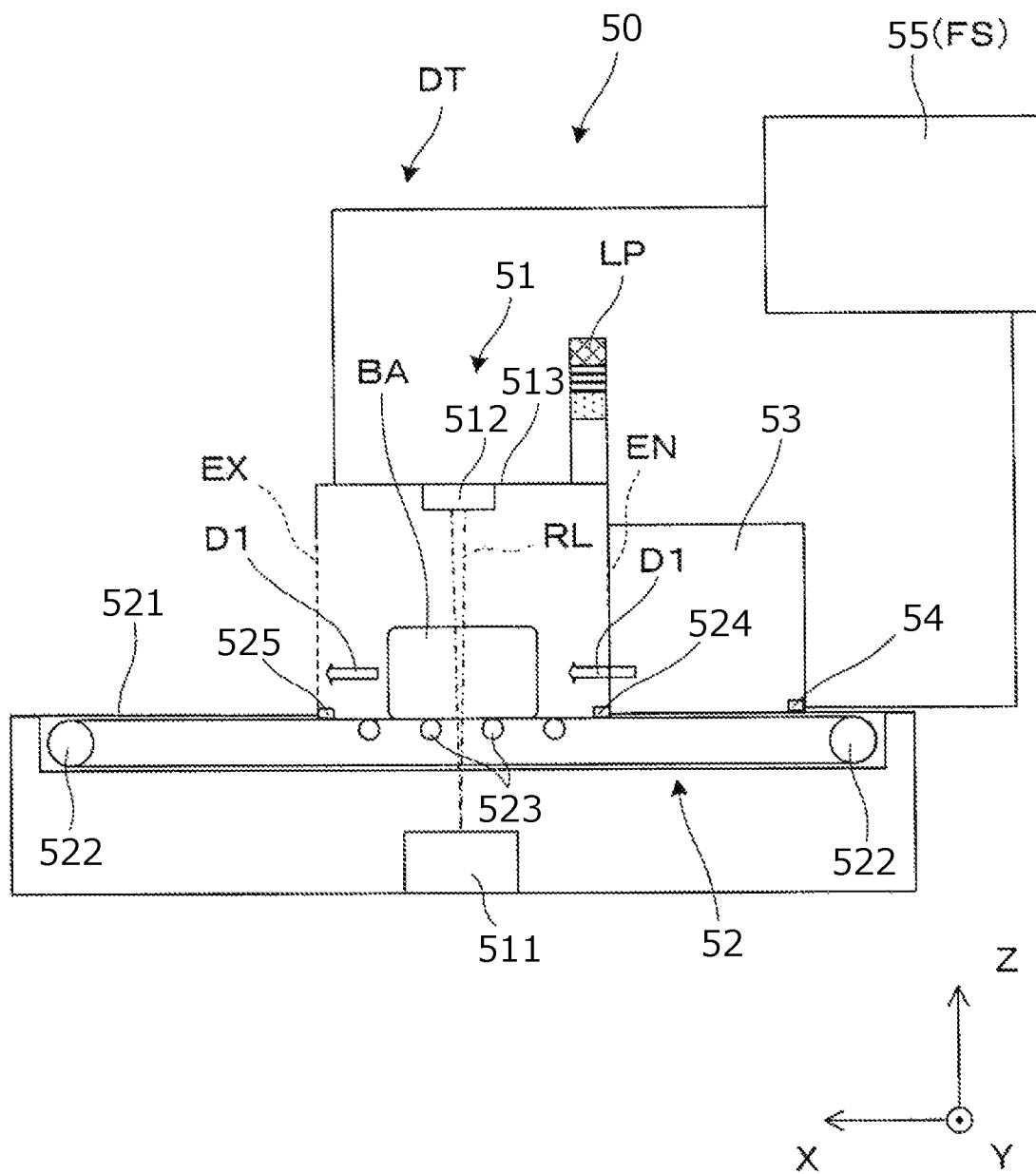
FIG. 20 shows a configuration of the baggage inspection device according to the fifth embodiment of the invention.

FIG. 19 is an oblique view of Baggage Inspection Device 50, and FIG. 20 is a side view of Baggage Inspection Device 50. Baggage Inspection Device 50 is installed, for example, at an entrance of an event venue, etc. Baggage Inspection Device 50 comprises Inspection Unit 51, Conveyor 52, Displaceable Member 53, Sensor 54 and Controller 55. Displaceable Member 53 and Sensor 54 constitute an example of an anti-jamming mechanism. Inspection Unit 51 and Controller 55 function as Judging Unit DT that judges if a baggage to be inspected contains a hazardous object. In the following description, as shown in FIGS. 19 and 20, Direction D1 in which Controller 55 transports Baggage BA by Conveyor 52 is referred to as X-direction, the left-right direction perpendicular to X-direction, i.e. horizontal direction, is referred to as Y-direction, and the up-down direction perpendicular to X-direction and Y-direction, i.e. vertical direction, is referred to as Z-direction.

When a passenger who is about to enter the venue places Baggage BA on Conveyor 52, Conveyor 52 transports Baggage BA toward Inspection Unit 51. Inspection Unit 51 inspects Baggage BA transported by Conveyor 52 on the transport path. More specifically, Inspection Unit 51 generates a perspective image of interior of Baggage BA. Baggage Inspection Device 50 judges if a hazardous object is contained in Baggage BA based on the image generated by Inspection Unit 51. Displaceable Member 53 is located on the entrance of Inspection Unit 51. Displaceable Member 53 is a hood-shaped member that covers the left, right and top of the transport path. Inspection Unit 51 can inspect only baggage of a size and a shape that can pass through an opening formed by Displaceable Member 53. When baggage that cannot pass through the opening formed by Displaceable Member 53 is transported by Conveyor 52, the baggage comes into contact with Displaceable Member 53. When the baggage comes into contact with Displaceable Member 53, Displaceable Member 53 is displaced. Sensor 54 detects the displacement of Displaceable Member 53. Therefore, before the baggage reaches the Inspection Unit 51, it is judged whether the size and shape of the baggage can be inspected by Inspection Unit 51.

Inspection Unit 51 comprises X-ray Emitter 511, X-ray Sensor Unit 512 and X-ray Shielding Box 513. X-ray Emitter 511 emits X-ray RL to Baggage BA. X-ray Sensor Unit 512 has a line sensor module and continuously outputs signals indicating amounts of X-ray RL irradiated from X-ray Emitter 511 and passing through Baggage BA. X-ray Shielding Box 513 is a rectangular-shaped box that houses X-ray Sensor Unit 512 and shields X-ray RL emitted from X-ray Emitter 511.

As shown in FIG. 20, the transport path of Conveyor 52 extends in X-direction from Entrance EN to Exit EX of X-ray Shielding Box 513. The transport path passes between X-ray Emitter 511 and X-ray Sensor Unit 512. Inspection Unit 51 inspects Baggage BA while Baggage BA passes between X-ray Emitter 511 and X-ray Sensor Unit 512.

Displaceable Member 53 is a hood-shaped member covering the transport path upstream of Inspection Unit 51. Displaceable Member 53 is formed of a transparent material such as acrylic. Therefore, the status of Baggage BA passing through the opening formed by Displaceable Member 53 can be monitored from the outside. A length of Displaceable Member 53 in Direction D1 (X direction) is, for example, about 30 cm. Accordingly, a passenger does not accidentally put his/her hand inside Inspection Unit 51 when placing Baggage BA on Conveyor 52.

Sensor 54 is attached to or placed near Displaceable Member 53 and detects a displacement of Displaceable Member 53. Sensor 54 has Magnet Unit MG consisting of a pair of a magnet and a magnetic member such as a magnet, a piece of iron, etc. that normally attach to each other by magnetic force and separate from each other upon displacement of Displaceable Member 53. Sensor 54 is connected to Controller 55, and outputs signals indicating whether the pair of members of Magnet Unit MG is attached to Controller 55.

Controller 55 comprises a CPU, a storage device, etc., and controls Inspection Unit 51, Conveyor 52 and Sensor 54. Controller 55 also analyzes an image generated by Inspection Unit 51 to automatically determine if Baggage BA contains hazardous objects. Accordingly, it is determined whether hazardous objects are contained in Baggage BA without relying on human experience and knowledge, and baggage inspection is performed quickly and accurately. In addition, Controller 55 prevents Baggage BA from entering Inspection Unit 51 if the size or shape of Baggage BA is such that Inspection Unit 51 cannot inspect it, based on a signal from Sensor 54 indicating whether Displaceable Member 53 is displaced. If a signal from Sensor 54 indicates that Displaceable Member 53 is displaced, Controller 55 functions as Forced Stopping Unit FS to force Conveyor 52 to stop transporting Baggage BA and to force Inspection Unit 51 to stop operation for inspecting Baggage BA.

An example of a configuration of Inspection Unit 51 and Conveyor 52, the main components of Baggage Inspection Device 50, is explained below with reference to FIG. 20.

X-ray Emitter 511 of Inspection Unit 51 is located on the lower side near the center of X-RAY Shielding Box 513. X-ray Emitter 511 emits X-ray RL to X-ray Sensor Unit 512. X-ray Sensor Unit 512 has a line sensor module and continuously outputs signals indicating amounts of X-ray RL irradiated from X-ray Emitter 511 and passing through Baggage BA. X-ray Shielding Box 513 is a rectangular-shaped box that houses X-ray Sensor Unit 512 and shields X-ray RL emitted from X-ray Emitter 511. X-ray Sensor Unit 512 outputs signals indicating amount of X-ray RL that X-ray Sensor Unit 512 receives. X-ray Sensor Unit 512 is located on the upper side near the center of X-ray Shielding Box 513, facing X-ray Emitter 511 across the transport path. The X-ray Sensor Unit 512 has a line sensor module with plural light-receiving elements arranged in a line in Y-direction and scans Baggage BA transported by Conveyor 52 in two dimensions. That is, when Baggage BA passes through the center of the interior space of X-ray Shielding Box 513, X-ray Emitter 511 emits X-ray RL to Baggage BA, and X-ray Sensor Unit 512 measures an amount of X-ray RL transmitted through Baggage BA, and a two-dimensional image representing interior of Baggage BA is generated based on the amount of X-ray RL measured by X-ray Sensor Unit 512. X-ray Shielding Box 513 is a rectangular-shaped cover with Entrance EN and Exit EX each of which is a rectangular opening. The inside of X-ray Shielding Box 513 is coated with an X-ray absorbing material such as lead to reduce X-ray leakage to the outside. X-ray shielding curtains (not shown in the figures) are placed to close Entrance EN and Exit EX of X-ray Shielding Box 513 to reduce leakage of X-rays from the X-Ray Shielding Box 513 through the openings to the outside.

Inspection Unit 51 may use any method to generate images using X-rays such as a method to generate only high-energy images by emitting high-energy X-rays, generating high-energy and low-energy images by emitting high-energy and low-energy X-rays, etc. Inspection Unit 51 may generate a shaded image based on difference between the high-energy and low-energy images.

As shown in FIG. 20, Conveyor 52 comprises Belt 521, Rollers 522 and Belt Support Bars 523. Belt 521 is an endless belt on which Baggage BA is placed. Two spaced apart Rollers 522 are bridged by Belt 521. Belt Support Bars 523 support the upper portion of Belt 521 from below. Conveyor 52 rotates Belt 521 by rotating Rollers 522 to transport Baggage BA placed on Belt 521 from the right end (−X end) to the left end (+X end) of FIG. 20 at a predetermined speed. Belt 521 transmits X-rays. Baggage Detector 524 is located near Entrance EN of X-ray Shielding Box 513 to detect Baggage BA that has reached Entrance EN. Baggage Detector 525 is located near Exit EX of X-ray Shielding Box 513 to detect Baggage BA that has reached Exit EX. Controller 55 instructs Conveyor 52 to start or stop operation based on results of detection of Baggage BA by Baggage Detectors 524 and 525, etc.

Baggage Inspection Device 50 with the above configuration generates a transmission image of Baggage BA by X-ray emission.

Baggage Inspection Device 50 has Lamp LP to indicate results of judgments of Controller 55 regarding whether Baggage BA contains a hazardous object. For example, Lamp LP lights up red when Baggage BA contains a hazardous object with a high probability, lights up blue when Baggage BA does not contain a hazardous object with a high probability, and lights up yellow when Baggage BA contains a hazardous object with a moderate probability. Lamp LP may be used for notification of risk of Baggage BA as well as for notification of other information. For example, when Sensor 54 detects displacement of Displaceable Member 53, Lamp LP may light up red under a control of Controller 55. In this case, Lamp LP functions as a notification unit notifying that Baggage BA cannot be inspected by Inspection Unit 51.

An example of a configuration of Displaceable Member 53 and Sensor 54 is explained below with reference to FIG. 21A, etc. In an example shown in FIGS. 21A and 21B, Displaceable Member 53 has Transparent Hood 531 and Hinge 532. Transparent Hood 531 is rotatably attached to Inspection Unit 51 by Hinge 532.

Transparent Hood 531 is a transparent member that extends along Direction D1. As shown in FIG. 21b, Transparent Hood 531 comprises Side Wall 531a and Side Wall 531b which face each other, and Top Wall 531c that connects Side Walls 531a and 531b at their upper edges. Transparent Hood 531 is made, for example, by one-piece molding. Transparent Hood 531 is transparent, allowing its interior to be observed from the outside. Entrance EN1 is the upstream opening of Transparent Hood 531. The shape of cross section of Transparent Hood 531 perpendicular to X-direction is constant in X-direction. The size and shape of Entrance EN1 indicates the size and shape of baggage that Inspection Unit 51 can inspect. Therefore, depending on whether Baggage BA can pass Entrance EN1, it is judged whether Inspection Unit 51 can inspect Baggage BA.

Figure 21A:
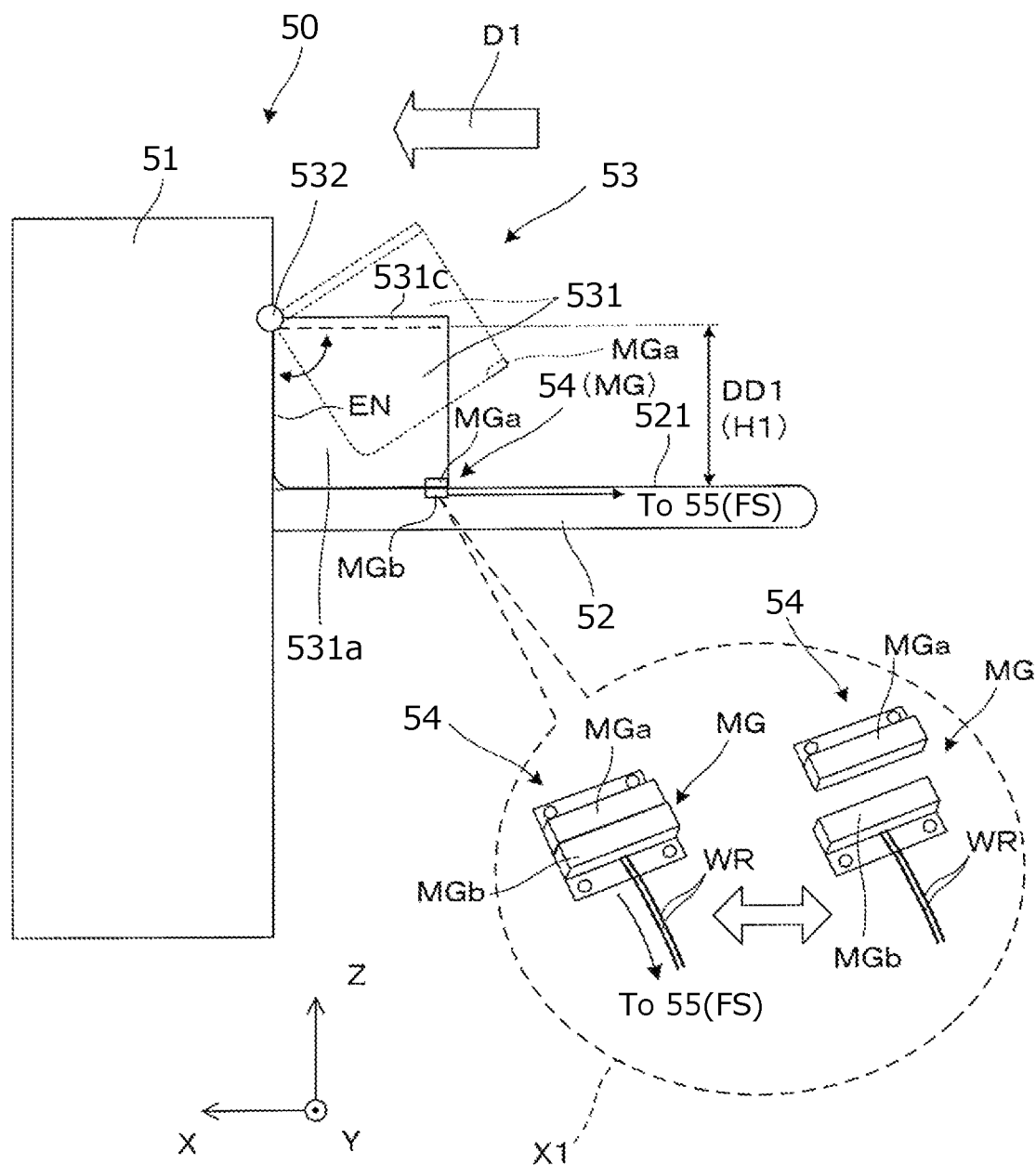
FIG. 21A is a side view of the baggage inspection device with an example of a displaceable member, according to the fifth embodiment of this invention.
Figure 21B:
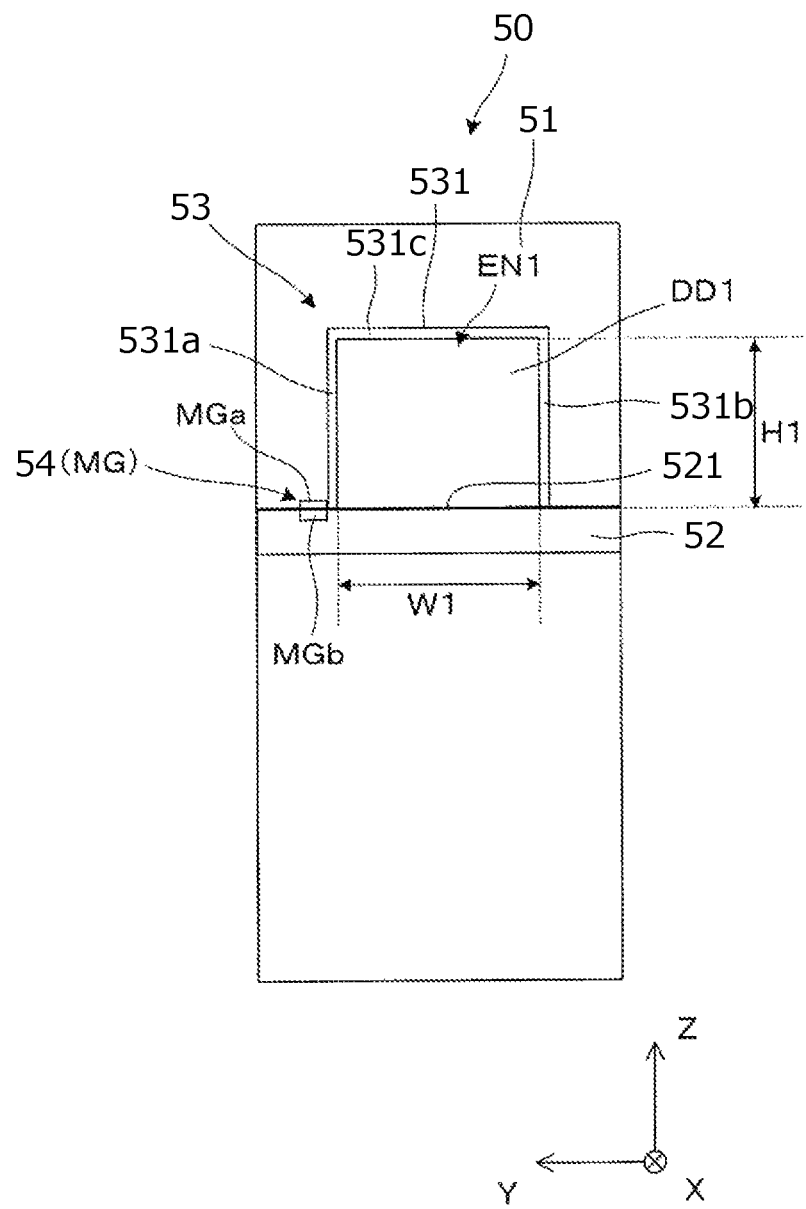
FIG. 21B is a front view of the baggage inspection device with the example of the displaceable member according to the fifth embodiment of this invention.

As shown in FIG. 21a, Hinge 532 is attached to one end of Top Wall 531c and Inspection Unit 51. Therefore, Transparent Hood 531 is freely rotatable around an axis extending in Y-direction, as shown by solid and dashed lines in FIG. 21A. When Transparent Hood 531 is in a normal position shown by the solid line in FIG. 21A, Transparent Hood 531 does not move any further clockwise because Transparent Hood 531 is in contact with Inspection Unit 51 and Conveyor 52. When Transparent Hood 531 receives a force acting in the counterclockwise rotational direction in FIG. 21A, it is displaced from the normal position to a position such as the position shown by the dashed line in FIG. 21A.

As shown in the partially enlarged view surrounded by Dashed Line X1 in FIG. 21A, Sensor 54 has Magnet Unit MG and Signal Line WR. Magnet Unit MG has a pair of magnets, i.e. Magnet MGa and Magnet MGb, which magnetically attach to each other. Signal Line WR connects Magnet MGb to Controller 55. Magnet MGa is attached to Transparent Hood 531 of Displaceable Member 53. Magnet MGb is attached to a non-moving portion of Conveyor 52. When Transparent Hood 531 is in the normal position shown by solid lines in FIG. 21A, Magnet MGa and Magnet MGb are attached to each other by magnetic force. While Magnet MGa and Magnet MGb are attached to each other, signal is output to Controller 55 via Signal Line WR. When Transparent Hood 531 receives a force greater than a predetermined magnitude in the counterclockwise rotational direction in FIG. 21A, Transparent Hood 531 rotates from the normal position, Magnet MGa and Magnet MGb separate from each other, and the signal output to Controller 55 via Signal Line WR is stopped. Controller 55 determines that Displaceable Member 53 is displaced when the signal output via Signal Line WR is stopped.

Between Transparent Hood 531 and Belt 521, a space is created through which Baggage BA passes. This space is shown as Space DD1 in FIG. 21B. Baggage BA with a size or shape that exceeds Height H1 or Width W1 of Space DD1 cannot pass through Displaceable Member 53. The size and shape of Space DD1 is the maximum size and shape of baggage that Inspection Unit 51 can inspect. Therefore, Baggage BA of a size or shape that cannot be inspected by Inspection Unit 51 comes into contact with Displaceable Member 53 to cause Displaceable Member 53 to be displaced. As a result, Controller 55 can detect Baggage BA with a size or shape that cannot be inspected by Inspection Unit 51, and instructs Conveyor 52 and Inspection Unit 51 to stop operations.

Figure 22A:
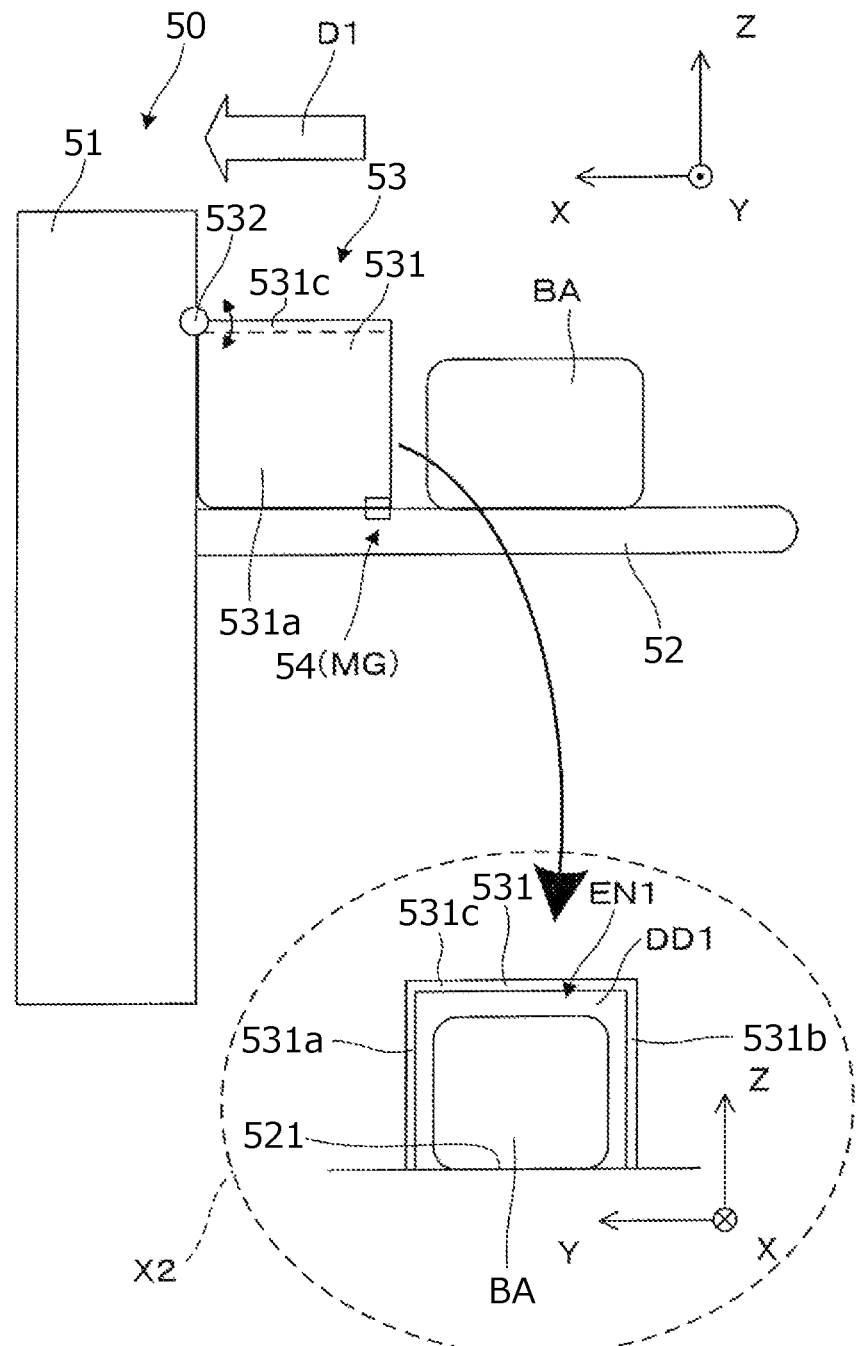
FIG. 22A is a side view of the baggage inspection device to illustrate an example of how the baggage with a size that can be inspected is transported through an opening formed by the displaceable member according to the fifth embodiment of this invention.
Figure 22B:
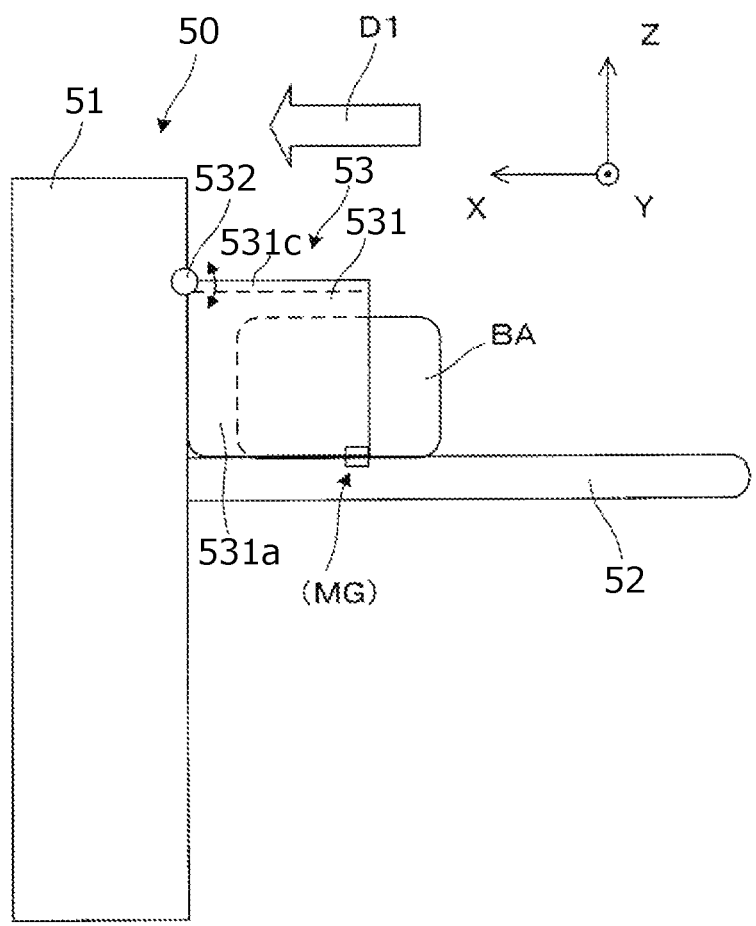
FIG. 22B is a side view of the baggage inspection device to illustrate the example of how the baggage with a size that can be inspected is transported through the opening formed by the displaceable member according to the fifth embodiment of this invention.

As shown in FIGS. 22A and 22B, if a size and shape of Baggage BA are such that Inspection Unit 51 can inspect it, Displaceable Member 53 is not displaced from the normal position and Baggage BA is transported in Space DD1 toward Inspection Unit 51.

Figure 23A:
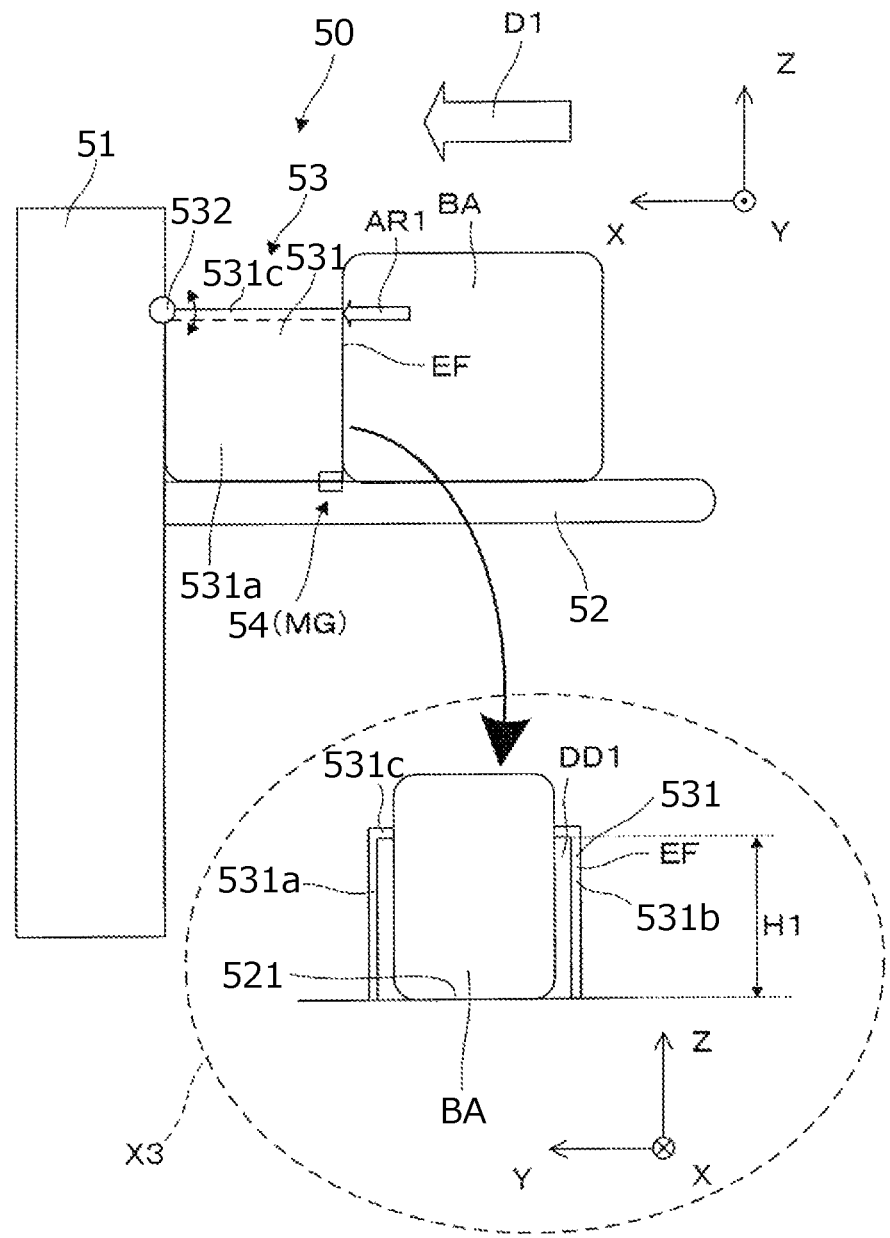
FIG. 23A is a side view of the baggage inspection device to illustrate an example of how the baggage with a size that cannot be inspected is transported through the opening formed by the displaceable member according to the fifth embodiment of this invention.
Figure 23B:
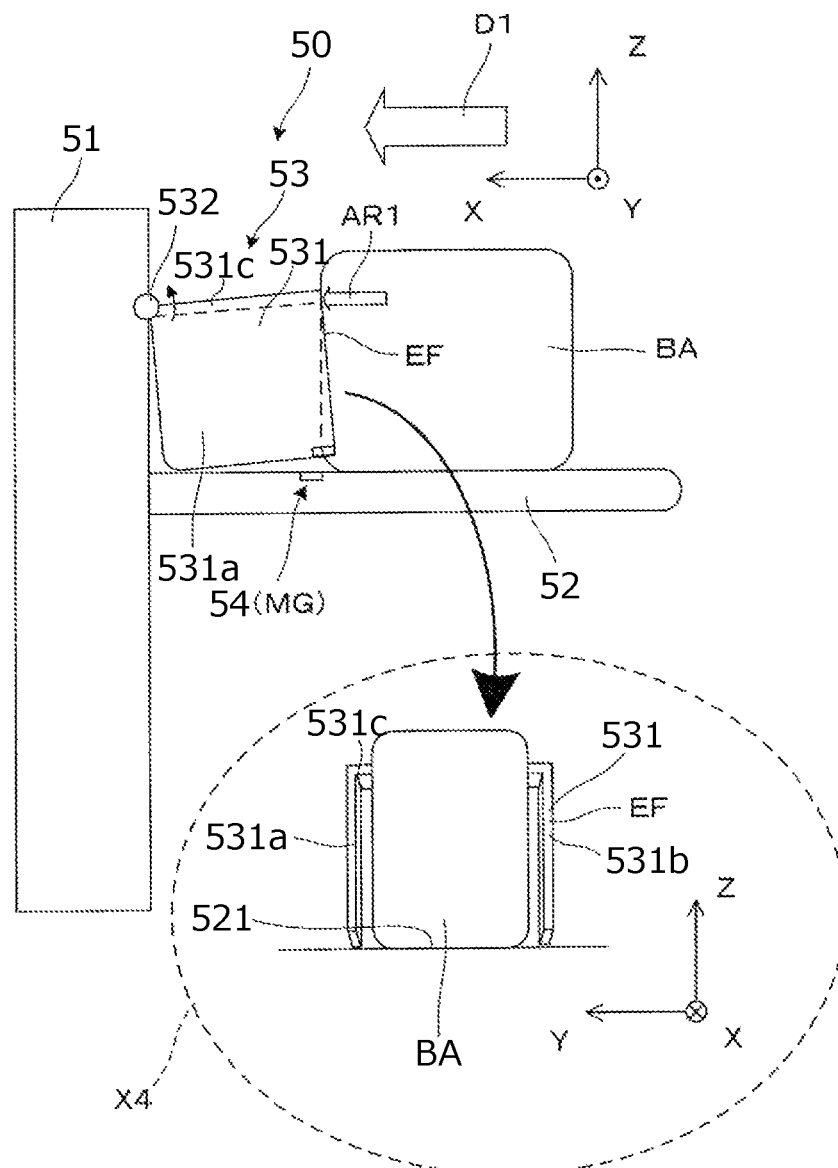
FIG. 23B is a side view of the baggage inspection device to illustrate the example of how the baggage with a size that cannot be inspected is transported through the opening formed by the displaceable member according to the fifth embodiment of this invention.

In contrast, as shown in FIGS. 23A and 23B, if a size and shape of Baggage BA are such that Inspection Unit 51 cannot inspect it, Baggage BA collides with End Face EF of Transparent Hood 531. Then, when Baggage BA further moves in Direction D1, Transparent Hood 531 receives a force from Baggage BA in the direction indicated by Arrow AR1 in FIGS. 23A and 23B. The force causes Transparent Hood 531 to rotate counterclockwise from the normal position as shown in FIG. 23B. Controller 55 can know the rotation of Displaceable Member 53 by a stop of signal from Sensor 54.

As described above, Baggage Inspection Device 50 detects Baggage BA of a size or shape that cannot be inspected by Inspection Unit 51 by using a simple configuration of Displaceable Member 53 and Sensor 54 that detects a displacement of Displaceable Member 53, and stops its operations when Baggage BA that cannot be inspected by Inspection Unit 51 is detected. Therefore, Baggage BA does not jam in Inspection Unit 51. As a result, throughput of baggage inspection is improved and manpower required for baggage inspection is saved.

Modified Examples of Fifth Embodiment

The fifth embodiment described above is an exemplary implementation of this invention, and may be modified in various ways. The following are modified examples of the fifth embodiment. Two or more of the following modified examples may be combined as needed.

(1) In the above-described embodiment, Sensor 54 uses magnets to detect a displacement of Displaceable Member 53. Sensor 54 may detect a displacement of Displaceable Member 53 without using magnets. For example, Sensor 54 may detect a displacement of Displaceable Member 53 using a switch, photoelectric sensor, photo sensor, etc. If Sensor 54 uses a photoelectric or photo sensor to detect a displacement of Displaceable Member 53, a light emitter and a light receiver may be positioned on opposite sides of Transparent Hood 531. Alternatively, the light emitter and the light receiver may be placed on the same side of Transparent Hood 531, and a mirror for reflecting light emitted from the light emitter to the light receiver may be placed in the position opposite to them across Transparent Hood 531. Sensor 54 may use a photoelectric sensor of diffuse-reflect type.

(2) A configuration in which Displaceable Member 53 is displaced by a force received from Baggage BA is not limited to the configuration using Hinge 532 as described above. For example, Displaceable Member 53 may be displaced in Direction D1 by a force received from Baggage BA. For example, Displaceable Member 53 may be contracted or deformed by a force received from Baggage BA, i.e. a portion of Displaceable Member 53 may be displaced.

(3) A shape, size, material, etc. of Displaceable Member 53 are not limited to those in the embodiment described above. For example, a material of Displaceable Member 53 may not be transparent. For example, a size and shape of End Face EF of Displaceable Member 53 may be larger than the size and shape that can be inspected by Inspection Unit 51, and a member forming an opening of the size and shape that can be inspected by Inspection Unit 51 may be placed inside Displaceable Member 53.

(4) For example, a shape of Transparent Hood 531 may be different from the shape in the embodiment described above so that a force in the direction indicated by Arrow AR1 in FIG. 23 is likely to cause Displaceable Member 53 to rotate in a counterclockwise direction. For example, End Face EF may be tapered. For example, Side Walls 531a and 531b, and Top Wall 531c may be curved.

(5) In the above embodiment, a length in Direction D1 (X-direction) of Displaceable Member 53 is about 30 cm, but it is not limited to about 30 cm.

(6) A position of Sensor 54 is not limited to the position near Entrance EN1 of Displaceable Member 53.

(7) In the description of the above embodiment, the case where Baggage BA is larger than Height H1 in the height direction is explained as an example. Similarly, Displaceable Member 53 is displaced when Baggage BA is larger than Width W1 in the width direction.

(8) A sensitivity with which Sensor 54 detects a displacement of Displaceable Member 53 should be adjusted to a sensitivity that does not detect a slight displacement of Displaceable Member 53 that occurs without contact between Displaceable Member 53 and Baggage BA.

(9) Displaceable Member 53, Sensor 54 and Controller 55, which judges whether Displaceable Member 53 is displaced based on signal output from Sensor 54, are comprised of a judging unit to judge whether a size and shape of baggage to be inspected is of a size and shape that can be inspected by Inspection Unit 51.

(10) Event venues, etc., may have plural entrances. The baggage inspection device of this invention may be placed at each of the plural entrances. In such a case, plural baggage inspection devices may be integrally managed by one or more administrators. For example, one inspector may be stationed at each of the entrances, and each inspector may be managed by plural managers, e.g., from a control room.

(11) Baggage Inspection Device 50 may have a stop button at each of several different positions that the inspector operates to force Baggage Inspection Device 50 to stop its operation. The inspector can quickly stop operation of Baggage Inspection Device 50 by operating the stop button closest to him/her when trouble arises.

(12) In addition to the inspection of Baggage BA by the baggage inspection device according to this invention, an inspection of objects worn by a passenger who carries Baggage BA may be performed by a body inspection device.

(13) A method by which Inspection Unit 51 inspects Baggage BA is not limited to a method using X-rays. For example, Inspection Unit 51 may inspect Baggage BA using electromagnetic waves other than X-rays, or it may inspect Baggage BA in a manner that does not use electromagnetic waves.

Figure 24:
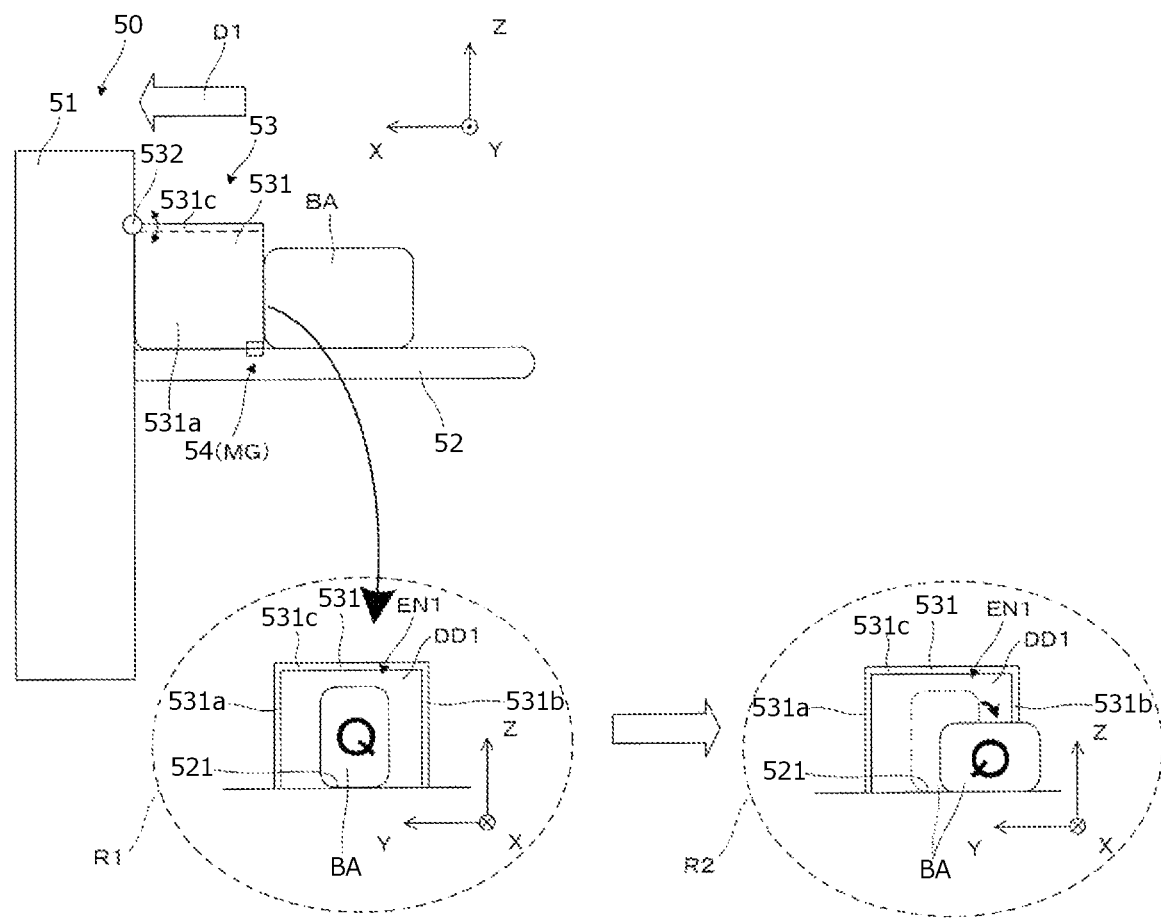
FIG. 24 is a side view illustrating an example of a relationship between a placement of the baggage to be inspected and its inspection availability.

(14) If Baggage BA of a size and shape that can be inspected by Inspection Unit 51 is not properly placed on Conveyor 52, Baggage BA may come into contact with Displaceable Member 53 and Baggage BA may be judged to be of a size or shape that cannot be inspected by Inspection Unit 51. For example, Baggage BA of a size and shape that can pass through an opening formed by Displaceable Member 53 as shown in the area enclosed by Dashed Line R1 of FIG. 24 may fall over sideways as shown in the area enclosed by Dashed Line R2 of FIG. 24. In this case, Baggage BA comes into contact with Displaceable Member 53, and Baggage BA is judged to be of a size or shape that cannot be inspected by Inspection Unit 51. In such cases, Baggage Inspection Device 50 may resume operation after the inspector repositions Baggage BA.

DESCRIPTION OF REFERENCE NUMERALS

10: Inspection Unit
11: X-ray Emitter
12: X-ray Sensor Unit
15: X-ray Shielding Box
20: Conveyor
22: Drive Mechanism
30: Curtain Assembly
31: Curtain
32: Transportation Assist Mechanism
100: Baggage Inspection Device
200: Baggage Inspection Device
250: Control Unit
4: Baggage Inspection Device
41: Inspection Unit
42: Conveyor
43: Loading Table
44: Cover
45: Cover
90: Inspection Unit
91: Cover
92: Cover
50: Baggage Inspection Device
51: Inspection Unit
52: Conveyor
53: Displaceable Member
54: Sensor 511: X-ray Emitter
512: X-ray Sensor Unit
513: X-ray Shielding Box
521: Belt
522: Rollers
523: Belt Support Bars
524: Baggage Detector
531: Transparent Hood
532: Hinge

The invention claimed is:

1. A baggage inspection device comprising:
a conveyor that transports baggage;
an X-ray scanner that scans the baggage transported by the conveyor by use of X-rays;
an endless belt-shaped curtain that shields electromagnetic waves emitted by the X-ray scanner for scanning the baggage; and
a shaft that passes through an inside of the endless belt-shaped curtain and that suspends the endless belt-shaped curtain;
wherein, as the baggage is transported by the conveyor, the endless belt-shaped curtain comes into contact with the baggage and rotates around the shaft, moving downward on an upstream side and upward on a downstream side in a transport direction of the baggage.

2. The baggage inspection device according to claim 1, further comprising:
a motor that rotates the shaft.

3. The baggage inspection device according to claim 2, wherein
the motor rotates the shaft in conjunction with transportation of the baggage by the conveyor.

4. The baggage inspection device according to claim 1, wherein
the endless belt-shaped curtain rotates freely around the shaft by a force imparted by the baggage transported by the conveyor.

5. The baggage inspection device according to claim 1, further comprising:
a support member that supports the shaft rotatably around an axis of the shaft and allows the shaft to seeing by freely rotating around an axis parallel to the axis of the shaft.

* * * * *